(12) United States Patent
Solh et al.

(10) Patent No.: US 11,367,286 B1
(45) Date of Patent: *Jun. 21, 2022

(54) COMPUTER VISION TO ENABLE SERVICES

(71) Applicant: Amazon Technologies, Inc., Seattle, WA (US)

(72) Inventors: Mashhour Solh, San Jose, CA (US); Siyi Ding, Milpitas, CA (US); Rohith Mysore Vijaya Kumar, Sunnyvale, CA (US); Xiaoran Wang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,164

(22) Filed: Mar. 5, 2020

Related U.S. Application Data

(63) Continuation of application No. 15/274,885, filed on Sep. 23, 2016, now Pat. No. 10,657,383.

(51) Int. Cl.
*G07C 9/00* (2020.01)
*H04L 67/125* (2022.01)
(Continued)

(52) U.S. Cl.
CPC ........... *G06V 20/52* (2022.01); *G06Q 10/083* (2013.01); *G06V 40/10* (2022.01);
(Continued)

(58) Field of Classification Search
CPC ............ G06K 9/00771; G06K 9/00362; H04L 67/125; G07C 9/00182
See application file for complete search history.

(56) References Cited

U.S. PATENT DOCUMENTS

| 9,743,643 B1 | 8/2017 | Kaplan et al. |
| 2007/0075854 A1* | 4/2007 | Tyler ........................ G08B 5/36 340/541 |

(Continued)

OTHER PUBLICATIONS

Uber Team Turkey; "uberPet—A ride for all paws"; Jun. 4, 2016 avaialble at https://www.uber.com/en-TR/blog/uberpet-a-ride-for-all-paws/ (Year: 2016).*

(Continued)

*Primary Examiner* — Jeremiah C Hallenbeck-Huber
(74) *Attorney, Agent, or Firm* — Lee & Hayes, P.C.

(57) ABSTRACT

This application describes techniques for providing computer vision for manual services. In some instances, a remote system may determine that a current time is within a threshold period of time of a scheduled service and, based on the determination, send a first message requesting image data to a camera apparatus located within an environment. After sending the first message, the remote system may receive image data associated with the environment from the camera apparatus and use the image to detect an object within the environment. The remote system can then send a second message to a device of a guest and a third message to a device of a user, where each of the second message and the third message indicates that the object is within the environment. In some instances, the object can include an animal while in some instances, the object can include a person.

20 Claims, 12 Drawing Sheets

(51) Int. Cl.
*G06V 20/52* (2022.01)
*G06Q 10/08* (2012.01)
*H04L 67/55* (2022.01)
*H04L 67/54* (2022.01)
*G06V 40/10* (2022.01)
*H04L 67/306* (2022.01)

(52) U.S. Cl.
CPC ........ *G07C 9/00182* (2013.01); *H04L 67/125* (2013.01); *H04L 67/24* (2013.01); *H04L 67/26* (2013.01); *G07C 2009/00261* (2013.01); *H04L 67/306* (2013.01)

(56) References Cited

U.S. PATENT DOCUMENTS

| | | | |
|---|---|---|---|
| 2007/0193834 A1 | 8/2007 | Pai et al. | |
| 2008/0004995 A1* | 1/2008 | Klingenberg | G06Q 10/08 705/28 |
| 2009/0304230 A1 | 12/2009 | Krahnstoever et al. | |
| 2011/0074570 A1 | 3/2011 | Feldstein et al. | |
| 2014/0020635 A1* | 1/2014 | Sayers | A01K 15/02 119/721 |
| 2015/0120598 A1 | 4/2015 | Fadell et al. | |
| 2015/0143750 A1* | 5/2015 | Jalbert | A01K 5/0291 49/25 |
| 2015/0145643 A1* | 5/2015 | Fadell | G08B 27/003 340/5.51 |
| 2015/0216142 A1* | 8/2015 | Landers | H04W 4/021 119/721 |
| 2015/0304540 A1* | 10/2015 | Breckman | A01K 15/021 348/211.3 |
| 2015/0310381 A1* | 10/2015 | Lyman | G06Q 10/083 705/330 |
| 2015/0310532 A1* | 10/2015 | Gura | G06Q 50/30 705/7.13 |
| 2015/0317597 A1* | 11/2015 | Shucker | G06Q 10/0833 235/375 |
| 2016/0104098 A1* | 4/2016 | Matula | H04L 61/6022 701/23 |
| 2016/0121479 A1 | 5/2016 | Lin et al. | |
| 2016/0163186 A1* | 6/2016 | Davidson | G06Q 10/0635 340/506 |
| 2016/0219254 A1 | 7/2016 | Hu et al. | |
| 2016/0253742 A1* | 9/2016 | Bosher | G06Q 30/06 705/26.82 |
| 2016/0307380 A1 | 10/2016 | Ho et al. | |
| 2016/0321506 A1* | 11/2016 | Fridental | G06K 9/00335 |
| 2017/0196202 A1* | 7/2017 | Ragonetti | A01K 29/005 |
| 2018/0032928 A1* | 2/2018 | Li | G06Q 10/02 |

OTHER PUBLICATIONS

Final Office Action dated Nov. 29, 2018 for U.S. Appl. No. 15/274,885 "Computer Vision to Enable Services" Solh, 23 pages.

Office Action for U.S. Appl. No. 15/274,885, dated Jun. 14, 2018, Solh, "Computer Vision to Enable Services", 30 pages.

Office Action for U.S. Appl. No. 15/274,885, dated Jun. 27, 2019, Solh, "Computer Vision to Enable Services", 21 pages.

* cited by examiner

COMPUTER VISION TO ENABLE SERVICES

RELATED APPLICATION

This application claims priority to and is a continuation of U.S. patent application Ser. No. 15/274,885, filed on Sep. 23, 2016, titled "COMPUTER VISION TO ENABLE SERVICES," the entire contents of which are incorporated herein by reference.

BACKGROUND

Homes are connected. They now include computing devices, such as desktops, tablets, entertainment systems, portable communication devices, speech-enabled devices, camera-based devices, security devices, and the like. Users interact with the computing devices in many ways, such as through mechanical devices (e.g., keyboards, mice, etc.), touch screens, motion, and gesture. In some instances, users may desire to use these devices in new ways. Provided herein are technical solutions to enable these and other types of devices to be used in new ways.

BRIEF DESCRIPTION OF THE DRAWINGS

The detailed description is described with reference to the accompanying drawings. In the drawings, the left-most digit(s) of a reference number identifies the figure in which the reference number first appears. The use of the same reference numbers in different figures indicates similar or identical components or features.

DETAILED DESCRIPTION

Figure 1:
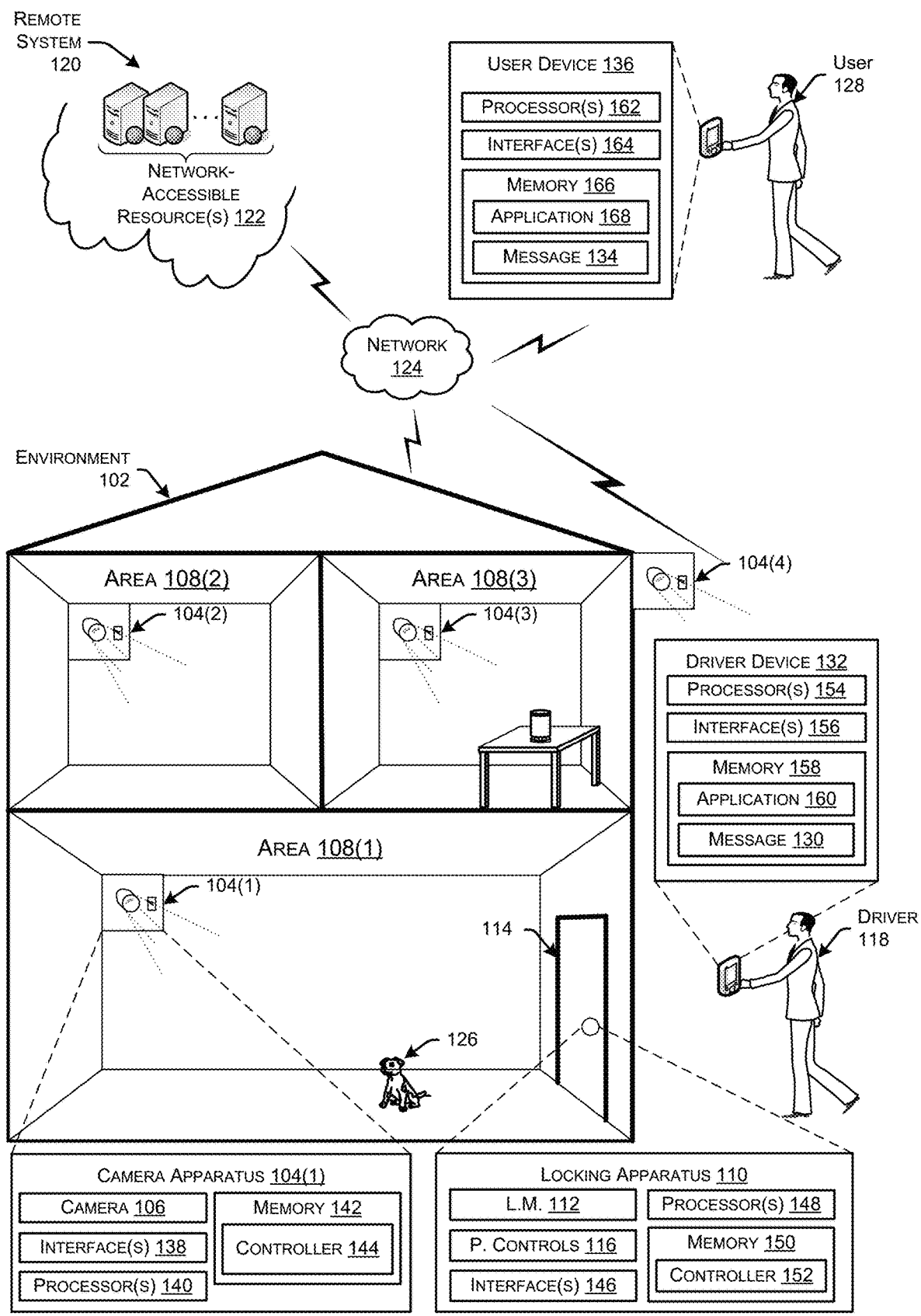
FIG. 1 is a schematic diagram of a first example of performing a delivery at an environment (e.g., a house or other structure). In the example of FIG. 1, the environment includes camera apparatuses configured to acquire image data (e.g., still image data, a video image data, etc.) within the environment and outside of the environment, and a locking apparatus configured to secure an entrance of the environment. Each of the camera apparatuses and the locking apparatus include a respective network interface for communicating with other electronic devices, such as a remote system. In some instances, the remote system is configured to analyze the image data received from the camera apparatus located within the environment during a specified time interval before a scheduled delivery to detect whether an object (e.g., animal, jewelry, etc.) is present within the environment. Based on detecting the object, the remote system is then configured to send a first message to a device of a delivery driver and send a second message to a device of a user. The remote system is further configured to cause the locking apparatus to remain in a locked position.

Techniques for providing computer-vision-based messages for manual services are described herein. Homes, offices, and other environments can include computing devices, such as those that have cameras, such as security cameras, thermal imaging cameras, and the like. The camera apparatuses described herein may include one or more network interfaces for sending image data, such as still image data and/or video data of an environment, to a remote system. For instance, a camera apparatus may receive a message from the remote system instructing the remote system to send image data to the remote system. Based on receiving the message, the camera apparatus may capture image data of the environment in which the camera apparatus is located, and send the image data to the remote system.

The environment may further include one or more security locks configured to secure one or more entrances of the environment. For instance, the environment can include a locking apparatus on a main entrance (e.g., door, window, or other type of entrance) of the environment. In some instances, the locking apparatus can include a network interface for receiving messages from other electronic devices, such as the remote system, the camera apparatus, a device of a user, a device of a guest, or the like. The message can instruct the locking apparatus to move a locking mechanism from a locked position to an unlocked position and/or from an unlocked positon to a locked position. In a locked position, the locking apparatus may cause the main entrance to be secure and inaccessible, such that a guest (e.g., a delivery person) cannot enter the environment. In an unlocked position, the locking apparatus may cause the main entrance to be unsecure and inaccessible, such that the guest can enter the environment.

In some instances, a guest may attempt to perform a manual service, such as an in-home service, within the environment. An in-home service can include any type of activity that can be performed by a guest within the environment. For example, the guest can be a delivery person and the in-home service can include an in-home delivery of a physical package. As another example, the guest can include a chef and the in-home service can include a catered meal cooked by the chef. As yet another example, the guest can include a housekeeper and the in-home service can include cleaning one or more areas (e.g., rooms) within the environment.

In some instances, the guest may include a robot that performs the in-home service within the environment. For instance, the guest can include any type of mechanical or virtual artificial agent, such as an electromechanical machine, that is guided by a computer program and/or electronic circuitry to perform the in-home service. In some instances, the robot can include an autonomous robot while in some instances, the robot can include a semi-autonomous robot.

Upon arrival of the guest at the environment, the remote system can receive a message indicating that the guest is at the environment. In some instances, the remote system may receive the message from a camera apparatus that detects the guest at the environment (e.g., a camera apparatus that is located outside of the environment). Additionally or alternatively, in some instances, the remote system may receive the message from a device associated with the guest. Based on receiving the message, the remote system then provides the guest with access to the environment.

In some instances, to provide the guest with access to the environment, the remote system may send a message to the camera apparatus that instruct the camera apparatus to provide the guest with access to the environment. In such instances, the camera apparatus can receive the message, and then send an additional message (and/or relay the message) to the locking apparatus that causes the locking apparatus to unlock the entrance of the environment. In some instances, the remote system may send the message to the locking apparatus that causes the locking apparatus to unlock the entrance of the environment. Still, in some instances, the remote system may send the message to a different electronic device, which may or may not be located within the environment. The different electronic device can receive the message, and then send an additional message (and/or relay the message) to the locking apparatus that causes the locking apparatus to unlock the entrance of the environment.

After unlocking the entrance for the guest, the guest can enter the environment through the entrance and perform the service within the environment. In some instances, one or more camera apparatuses within the environment capture image data associated with the environment while the guest is within the environment. The one or more camera apparatuses then send the image data to the remote system for monitoring the environment. When the guest is finished performing the in-home service and exits the environment, the locking apparatus can return to a locked state in order to secure the environment.

In some instances, before the locking apparatus provides access to the guest, a remote system can send the guest messages indicating what is inside of the environment. For instance, the remote system can send a message to the guest that alerts the guest if there is something within the environment (e.g. objects, an unfavorable conditions, etc.). Objects within the environment can include people, animals (dogs, cats, etc.), items (e.g., jewelry, etc.), or the like. Unfavorable conditions within the environment can include anything that might cause the guest to not want to enter the environment. For instance, message can notify the guest that the environment is dark, that there is a fire within the environment, or the like. In addition to providing the messages, in some instances, the remote system can further cause the environment to remain secure by not unlocking the entrance for the guest, if the environment is currently unsecure, or the remote system can cause the environment to be secure by locking the entrance of the environment, if the environment is current unsecure.

To send the messages, the remote system can store data associated with one or more scheduled services at a location corresponding to the environment. Data associated with a scheduled service can include, for example, the geographical location of the environment, a time for the scheduled service, an identity of a user, information on how to perform the service, an identity of the guest, or the like. In some instances, the remote system can store data associated with a scheduled service in association with a user profile of the user. The user profile can include data indicating a number of occupants within the environment, a number of animals within the environment, designated animal zones (e.g., animal safe zones within the environment, animal notification zones within the environment, etc.), speaker identification data of each occupant or other related people (e.g., data that can be used to identify a person based on audio data representing the person's voice), among other things.

In some instances, the remote system can further store data associated with one or more classifiers that the remote system uses to monitor the environment. An object classifier can include data indicating one or more characteristics (e.g., features) of an object, data indicating when to monitor the environment for the object, among other things. In some instances, characteristics of an object can include one or more of a size of the object, a shape of the object, a color of the object, or the like.

In some instances, the remote systems may train the one or more object classifiers using image data that the remote system receives from one or more environments. For instance, the remote system can receive, from one or more camera apparatuses, positive image data corresponding to images that include an object and negative image data corresponding to images that do not include the object. The remote system can then use the positive image data and the negative image data to train an object classifier for the object using one or more machine learning algorithms.

In some instances, the remote system can use the data associated with the scheduled services and the data associated with the object classifiers to monitor the environment. For instance, the remote system can use data associated a scheduled service to determine that a service is scheduled at the environment at a specific time. Based on the time, the remote system can determine a starting time in which to start monitoring the environment for various objects and unfavorable conditions. For instance, the remote system can use a user profile to determine that an animal, such as a dog, may be within a portion of the environment. The remote system can then use an object classifier associated with dogs to determine that the environment should be monitored for a specified time before the guest arrives at the environment. For instance, if the time of the service is scheduled for 4:00 p.m., and the monitoring time indicates that the remote system should monitor the environment for three hours before the service time, then the remote system can determine that a starting time for monitoring the environment for the dog is around 1:00 p.m.

In some instances, the remote system may use a similar process for determining when to monitor for other objects within the environment. For instance, the remote system can determine that a person, such as the user, may be home at the scheduled service time. As such, the remote system may use an object classifier for people in order to determine a starting time for monitoring the environment for the user. For instance, and using the example above, if the object classifier for people indicates that the remote system should monitor the environment for thirty minutes, the remote system can determine that a starting time for monitoring the environment for the user is around 3:30 p.m.

The remote system can use various factors when determining the threshold period of time for an object classifier. In some instances, the remote system can determine the threshold period of time based on a type of object that the object classifier represents. For example, the remote system can determine that a shorter threshold period of time should be used for people than for animals since people have a greater tendency to enter and leave the environment. As such, a detected person within the environment is more likely to leave the environment before the guest arrives than a detected animal.

In some instances, the remote system can determine the scheduled time for the scheduled service using the data associated with the scheduled service. For instance, the data can indicate a time (e.g., 4:00 p.m.) for the scheduled service. Additionally or alternatively, in some instances, the remote system can determine the scheduled time using other factors. For instance, the remote system can determine an initial time using the data associated with the scheduled service, and then update the initial time based on various factors. Factor can include among other things, weather, traffic conditions, a current location between the guest performing the scheduled service and the location of the scheduled service, average service times associated with the scheduled service (e.g., average delivery times), other scheduled services (e.g., other scheduled deliveries), or the like.

Additionally or alternatively, in some instances, the remote system can determine the scheduled time for the scheduled service using data associated with other scheduled services. For instance, the remote system can use data indicating a number of services that are going to be performed during a given period of time (e.g., a day) and an average time for each service to determine a scheduled time for each scheduled service during the given time period. Using the scheduled time for each service, the remote system can then determine the scheduled time for the scheduled service at the environment. Additionally, in some instances, the remote system can then update the scheduled time based on weather, traffic conditions, a current location between the guest performing the scheduled service and the location of the scheduled service, or the like.

In some instances, the remote system uses one or more determined starting times to monitor the environment before the guest arrives at the environment. For instance, the remote system can begin receiving image data from the camera apparatus based on the earliest starting time (e.g., 1:00 p.m. in the example above). To begin receiving the image data, the remote system can send a message to the camera apparatus at the earliest starting time that requests the image data from the camera apparatus. For instance, the camera apparatus can receive the message from the remote system. In some instances, if the camera apparatus is not already capturing image data, the camera apparatus can begin capturing image data of the environment and send the image data to the remote system. In some instances, if the camera apparatus is already capturing image data, the camera apparatus can begin sending the image data to the remote system.

In some instances, in addition to or alternatively from determining the starting times, the remote system can receive a message from a device of the guest. The message can indicate that the guest is at the environment. Based on receiving the message, the remote system can then send the message to the camera apparatus that request the image data.

The remote system can receive the image data from the camera apparatus and then use the image data to monitor the environment for objects and unfavorable conditions. In some examples, the remote system may continually monitor the environment using image data that the remote system receives from the camera apparatus. For instance, the remote system can receive a constant feed of video data from the camera apparatus and continually monitor the video data for objects. Additionally or alternatively, in some instances, the remote system may monitor the environment using image data at specified time intervals. For instance, the remote system can analyze image data of the environment every five seconds, thirty seconds, minute, or the like to monitor for objects and unfavorable conditions within the environment. In some instances, the specified time intervals may change over the course of monitoring the environment.

To monitor the image data, the remote system can analyze the image data using one or more object classifiers in order to detect objects (and similarly unfavorable conditions described below) within the environment. To analyze the image data, in some instances, the remote system can use initial image data received from the camera apparatus and generate a background image for the environment. The remote system can then process image data that the remote system later receives from the camera apparatus using the background image. For instance, the remote system can subtract the background image from images associated with image data in order to detect an object and/or unfavorable condition within the environment. Based on detecting an object and/or unfavorable condition, the remote system can then analyze the object and/or unfavorable condition using the one or more object classifiers in order to determine a type of object (e.g., a person, animal, item, etc.) and/or type of unfavorable condition (e.g., fire, low light, etc.) within the environment.

In some instances, analyzing the object using the one or more classifiers can include comparing characteristics of the object to characteristics of different objects associated with the one or more object classifiers. For instance, the remote system can identify one or more characteristics of the object within the environment. The remote system can then compare the one or more characteristics to characteristics of objects stored in each of the one or more object classifiers. Based on matching characteristics of the object to characteristics of a specified object within an object classifier, the remote system can determine which type of object is within the environment.

After identifying an object within the environment, the remote system can determine whether the object is within the environment between the starting time for the respective object and the scheduled time of the service. For instance, the remote system can determine a time associated with image data that includes the object. The remote system can then determine whether the time associated with the image data is between the starting time and the scheduled time for the service (e.g., within the threshold period of time). Based on the object being within the environment between the starting time and the scheduled time for the service, the remote system can perform different processes based on the type of object that is within the environment. For instance, the remote system can perform a first process based on the object including an animal, and perform a second process based on the object including a user.

For instance, based on the object including an animal, the remote system can send message to a device of the guest (and/or a device associated with scheduled service). The message can include one or more of an indication that the animal is within the environment, a type of animal that is within the environment, an image of the environment that includes an indication of the position of the animal. In some instances, when the service includes an in-home delivery, the message can further include an indication of a position for performing the in-home delivery (e.g., a drop-off zone (e.g., room, position, etc.) for a package), an indication of how long it will take for the object to reach the position of the in-home delivery and/or the delivery door, information specifying how to proceed with the delivery, or the like. In some instances, the guest can then decide how to proceed with the delivery based on the message.

For instance, the information can include text, an image, audio, or other type of data that the device can display to the guest. In some examples, the information can specify that the guest is not to enter the environment. In some examples, when the service includes an in-home service, the information can specify that the guest is to leave the package outside of the environment (e.g., perform an outside delivery). Additionally or alternatively, in some examples, the information can request an indication from the guest of whether the guest still wants to proceed with performing the in-home service. Based on the information, the guest can then send the remote system a message indicating whether to proceed with the in-home service.

In some instances, the device of the guest can send content to the guest, such as image or video of the environment that indicates the current position of the animal, the type of animal, the time that it will take for the animal to reach the entrance, and/or the like. Based on the content, the guest may determine that it is still safe to proceed with performing the in-home service. As such, the device of the guest can receive input to proceed with the in-home service. Based on the input, the device of the guest can send a message to the remote system to unlock the environment if the guest has indicated that he or she is comfortable continuing with the in-home service.

In some instances, based on receiving the message, the remote system can send a message to the locking apparatus that causes the locking apparatus to unlock the entrance for the guest. In some instances, the remote system can send the message to the camera apparatus and the camera apparatus can cause the locking apparatus to unlock the entrance. For instance, the camera apparatus can receive the message from the remote system. Based on the message, the camera apparatus can then send an additional message to the locking apparatus that causes the locking apparatus to unlock the entrance for the guest.

After unlocking the locking apparatus, the remote system can determine when to send an additional message to camera apparatus and/or the locking apparatus that causes the locking apparatus to once again secure (e.g., lock) the entrance of the environment. In some instances, the remote system sends the additional message based on a threshold period time passing after sending the unlocking message. For instance, the remote system can send the additional message two minutes after sending the unlocking message. In some instances, the remote system can send the additional message based on receiving a first message from the device of the guest. For instance, the device of the guest can receive input that causes the device to send the first message to the remote system. Additionally or alternatively, the device of the guest can send the first message based on the detecting that the device is outside of a threshold location (e.g., a geolocation) of the environment.

In some instances, based on detecting the animal within the environment, the remote system can further send a message to a device of the user. The message can include an indication that the animal is within the environment, an indication of how the guest is proceed with the in-home service, a request to re-schedule the service, or the like. In some instances, the user can use the user device to send a message back to the remote system indicating that the animal is secure within the environment and/or that it is safe for the guest to perform the in-home service. Based in part on receiving the message, the remote system can cause the locking mechanism to unlock the entrance using a similar process as described above.

It should be noted that, in some instances, the remote system can receive, from the device of the user, a message that includes information designating locations within the environment as designated animal zones (e.g., animal safe zones, animal notification zones, etc.). For instance, the information can designate a first area within the environment as an animal safe zone and a second area within the environment as an animal notification zone. An animal safe zone can include an area within the environment in which the animal is secure. For instance, the animal safe zone can correspond to a closed room, kennel, and/or other secure area within the environment in which the animal does not have access to guest while the guest performs the in-home service. An animal notification zone can include an area within the environment in which the animal is unsecure. For instance, the animal notification zone can correspond an area within the environment in which the animal does have access to the guest while the guest performs the in-home service.

For instance, for an in-home delivery, the animal safe zone can include an area within the environment in which animal does not have access to a zone (e.g., area within the environment) in which the delivery of the physical package is to occur. Additionally, the animal notification zone can include an area within the environment in which the animal does have access to the zone in which the delivery of the physical package is to occur.

When the user sends the information to the remote system, the remote system can use the information to determine whether to notify the guest and/or the user about the animal. For instance, the remote system may refrain from sending the messages to the guest and/or the user based on the animal being detected within the animal safe zone. Additionally, based on detecting the animal is the animal safe zone, the remote system may cause the locking apparatus to unlock the entrance for the guest when the guest arrives at the location to perform the in-home service.

Additionally, in some instances, the remote system can determine whether the animal is within an animal safe zone or an animal notification zone. For instance, the remote system can analyze image data from the environment to determine whether the animal is within an area (closed room, kennel, or other secure area) of the environment that does not have access to the guest while the guest performs the in-home service. Based on determining that the animal is within an animal safe zone of the environment, the remote system may refrain from sending the messages to the guest and/or the user. Additionally, based on detecting the animal is the animal safe zone, the remote system may cause the locking apparatus to unlock the entrance for the guest when the guest arrives at the environment to perform the in-home service.

Besides detecting animals within the environment, the remote system can further detect people (such as the user) within the environment. Based on detecting a person within the environment, the remote system can determine that the person is within the environment between the starting time associated with people and the scheduled delivery time. In some instances, the remote system can then send a message to the device of the guest that includes an indication that a person is within the environment, information specifying how to proceed with the service, an image of the environment that includes an indication of the position of the person, and/or the like. In some instances, the remote system can further cause the locking apparatus to secure the entrance if the locking apparatus is currently in an unlocked position.

In some instances, the remote system can additionally send a message to a device of the user. The message can indicate that the remote system detected a person within the environment, that the guest is near to the location, the scheduled time for the service, that the guest will not automatically enter the environment to perform the in-home service, and/or the like. In some instances, the user can then use the user device to send a message to the remote system to unlock to locking apparatus for the guest. Additionally or alternatively, in some instances, the user can move to the entrance to manually unlock the locking apparatus for the guest.

In some instances, the user can send a message to the remote system indicating how the remote system is to proceed when detecting a person within the environment. For example, the message can indicate that the remote system is to allow the guest to proceed with the in-home service when the person includes the user, but that the remote system is not to allow the guest to proceed with the in-home service when the person includes someone other than the user (and/or visa-versa). For another example, the message can indicate that the remote system is to notify the user of the person only when the person is someone other than the user.

In some instances, the remote system can further send messages to one or more additional electronic device within the environment. For instance, the remote system can determine that the user includes a wireless electronic device within the environment. In some instances, the wireless electronic device outputs audio within the environment via a speaker. The remote system can send an audio signal to the wireless electronic device that causes the wireless electronic device to output audio. In some instances, the output audio can include a notification that the guest is near to the location of the environment.

As discussed above, in addition to detecting objects within the environment, the remote system can further detect unfavorable conditions within the environment. For instance, at a time that the guest arrives at the environment and/or a threshold period of time before the guest arrives at the environment, the remote system can analyze the image data to determine whether any unfavorable conditions exist within the environment (using a similar process as above for objects). Unfavorable conditions within the environment can include anything that might cause the gest to not want to enter the environment. Based on detecting an unfavorable condition within the environment, the remote system can send a message to the device of the guest warning the guest of the unfavorable condition. Additionally, the remote system can send a message to the device of the user that warns the user of the unfavorable condition. In some instances, additionally to sending the messages, the remote system can send message to the locking apparatus that causes the locking to remain in a locked state.

Additionally, in some instances, the remote system may be configured to detect specific objects and/or unfavorable conditions at a time that the guest arrives at the environment. For instance, when the guest arrives at the environment, the remote system may analyze the image data in order to determine whether any valuable objects (e.g., electronics, jewelry, money, etc.) are located within an area that the guest is to perform the in-home service. Based on detecting a valuable object, the remote system may send a message to the device of the user indicating that the valuable object is within the area. The remote system may further send a message to the device of the guest indicating that the guest will not be provided access to the environment. In some instances, the user may wish to continue with the in-home service and send a message to the remote system. The remote system can receive the message from the user and provide the guest access to the environment.

It should be noted that, in some instances, after detecting an object and/or unfavorable condition within the environment, the remote system may monitor the object and/or unfavorable condition until the scheduled time of the service and/or until the guest arrives at the environment. For example, the remote system may detect an animal at a position within the environment that is not secure within the threshold period of time before the scheduled time of the service. Based on detecting the animal, the remote system may monitor (e.g., track) the animal until the guest arrives at the environment to perform the in-home service. While tracking the animal, the remote system may detect that the animal moves from the position that is not secure to a position within environment that is secure. Based on detecting that the animal moved the position that is secure, the remote system may determine not to send the messages to the device of the guest and/or the device of the user. The remote system may further send a message to the camera apparatus and/or the locking apparatus to unlock the entrance to the environment when the guest arrives to perform the in-home service.

For another example, the remote system may detect a person in the environment within the threshold period of time before the scheduled time for the service. Based on detecting the person, the remote system may monitor (e.g., track) the person until the guest arrives at the environment to perform the in-home service. While tracking the person, the remote system may detect that the person leaves the environment. Based on detecting that the person leaves the environment, the remote system may determine not to send the messages to the device of the guest and/or the device of the user. The remote system may further send a message to the camera apparatus and/or the locking apparatus to unlock the entrance to the environment when the guest arrives to perform the in-home service.

Additionally, in some examples, in addition to or alternatively from the remote system monitoring the environment, the camera apparatus may monitor the environment for objects and/or unfavorable conditions. For instance, the camera apparatus may receive the data associated with a scheduled service and the one or more object classifiers. In such an instance, the camera apparatus can determine a time period for monitoring the environment using the data, and monitor the environment during the time period using a similar process as described above for the remote system. Additionally, based on detecting an object and/or unfavorable condition within the environment, the camera apparatus can send messages to the device of the guest and/or the devices of the user. The camera apparatus can further send a message to the locking apparatus to lock and/or unlock the entrance of the environment.

As described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to provide indications, notifications, alerts, and/or requests to another electronic device.

Additionally, as discussed above, image data can include still image data and video data. Still image data can represent images captured within an environment that the remote system receives from a camera apparatus at given time intervals. Video data can represent a video captured within the environment that the remote system receives from a camera apparatus. For instance, formats for image data can include Joint Photographic Expert Group (JPEG), Exchangeable Image File Format (Exif), Tagged Image File Format (TIFF), Graphics Interchange Format (GIF), Portable Network Graphics (PNG), Better Portable Graphics (BPG) or any other type of image data format that electronic devices can send and receive with one another.

Figure 2:
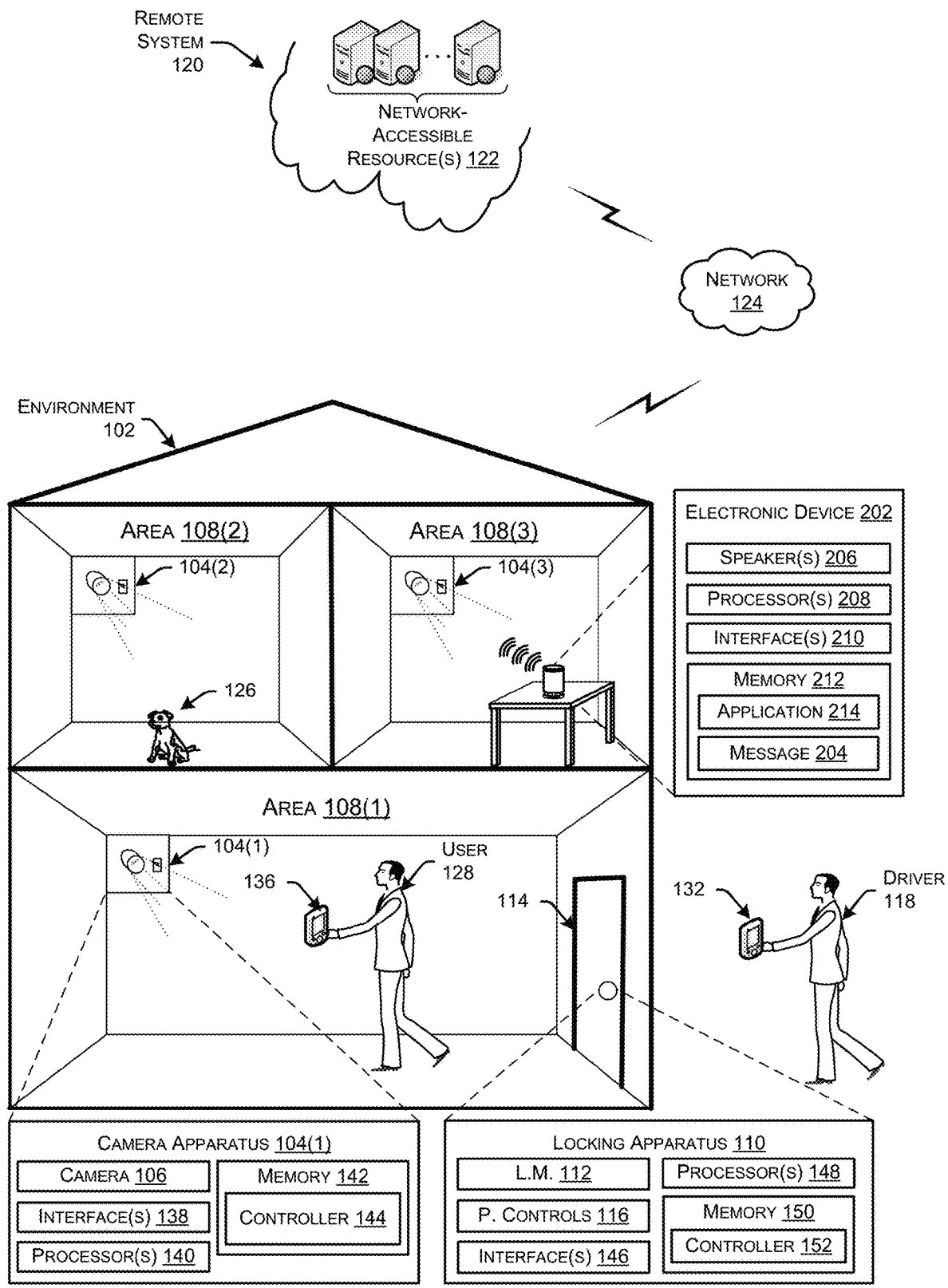
FIG. 2 is a schematic diagram of a second example of performing a delivery at the environment. In the example of FIG. 2, the environment that includes the camera apparatus and the locking apparatus. In the schematic diagram of FIG. 2, the remote system is configured to analyze the image data received from the camera apparatus within the environment during a specified time interval before a scheduled delivery to detect whether a person (e.g., the user) is within the environment. Based on detecting the person, the remote system is configured to send a first message to the device of the delivery driver and send a second message to the device of the user. The remote system is further configured send a message instructing the locking apparatus to secure the environment.

As a preliminary note, FIGS. 1 and 2 are described with respect to a manual service including an in-home delivery for clarity reasons. For instance, FIGS. 1 and 2 illustrate a driver (e.g., a guest) arriving at the environment to perform an in-home delivery (e.g., an in-home service) of a physical package, and receiving a message using a driver device (e.g., a user device). However, in other examples, the manual service can include any type of activity that can be performed by a guest within the environment and/or outside of the environment.

FIG. 1 is a schematic diagram of a first example of performing a delivery at an environment 102. In the example of FIG. 1, the environment 102 that includes one or more camera apparatuses 104(1)-(4) that each include a camera 106 (although FIG. 1 only illustrates details of camera apparatus 104(1) for clarity purposes) configured to acquire image data (e.g., still image data, video data, etc.) of different respective areas 108(1)-(3) (e.g., rooms, zones, etc.) within the environment 102 and outside of the environment 102. For instance, the camera apparatus 104(1) is configured to acquire image data from the first area 108(1) within the environment 102, the camera apparatus 104(2) is configured to acquire image data from the second area 108(2) within the environment 102, the camera apparatus 104(3) is configured to acquire image data from the third area 108(3) within the environment 102, and the camera apparatus 104(4) is configured to acquire image data from outside of the environment.

Environment 102 further includes a locking apparatus 110 that includes a locking mechanism 112 configured to secure the main entrance 114 of the environment 102. In addition, the locking apparatus 110 further includes physical controls 116 that are configured to cause the locking apparatus 110 to move the locking mechanism from a locked position to an unlocked position and/or from an unlocked position to a locked position. In a locked position, the locking apparatus 110 causes the main entrance to be secure and inaccessible, such that a driver 118 cannot enter the environment to perform an in-home delivery. In an unlocked position, the locking apparatus 110 causes the main entrance to be accessible, such that the driver 118 can enter the environment 102 to perform in-home deliveries.

In some instances, a remote system 120 associated with network accessible resource(s) 122 is configured to send messages to the camera apparatuses 104(1)-(4) that request the camera apparatuses 104(1)-(4) to send acquired image data to the remote system 120 via a network connection 124. For instance, the remote system 120 can determine that the driver 118 is scheduled to make a delivery at the environment 102. In some instances, the remote system 120 makes the determination using stored data associated with the scheduled delivery. The remote system 120 can then determine starting time for monitoring the environment 102 using one or more object classifiers. In some instances, the starting time can include a threshold period of time before the scheduled delivery in which the remote system is to monitor the environment. Based on the starting time, the remote system 120 can send a message to one or more of the camera apparatuses 104(1)-(4) that requests the image data.

In some instances, in addition to or alternatively from determining the starting time, the remote system 120 can receive a message indicating the driver 118 is at the environment. For instance, the driver device 132 can send the message to the remote system 120 when the driver 118 arrives at the environment. Additionally, in some instance, the camera apparatus 104(4) can send the message to the remote system 120 after detecting the driver 118 outside of the environment 102. Moreover, in some instance, the remote system 120 can determine that the driver 118 is at the environment based on geographical data associated with the driver device 132. For instance, the remote system 120 can receive global positioning data (GPS) data associated with the driver device 132 and use the GPS data to determine that the driver 118 is at the environment 102. Based on determining that the driver 118 is at the environment 102, the remote system 120 can send the message to one or more of the camera apparatuses 104(1)-(3) that requests the image data.

The camera apparatuses 104(1)-(3) can receive the message from the remote system 120 and based on the message, send the image data to the remote system 120. Using the image data, the remote system 120 can determine whether an object (e.g., animal 126) or other unfavorable condition of potential concern is within a area 108(1)-(3) of the environment 102 during the time window. In some instances, a user 128 associated with the scheduled delivery can designate one or more of the areas (e.g., areas 108(1)-(3)) within the environment 102 as animal safe zones and one or more of the areas (e.g., areas 108(1)-(3)) within the environment 102 as animal notification zones. An animal safe zone can include an area within the environment 102 in which the animal 126 is secure. For instance, the animal safe zone can correspond to a closed room, kennel, and/or other secure location within the environment 102 in which the animal 126 does not have access to the main entrance 114 and/or a delivery zone for a physical package. An animal notification zone can include an area within the environment 102 in which the animal 126 is unsecure. For instance, the animal notification zone can correspond an area within the environment 102 that includes access to the main entrance 114 and/or a delivery zone for a physical package.

For instance, in the example of FIG. 1, the user 128 associated with the scheduled delivery can designate the first area 108(1) within the environment 102 as an animal notification zone, and the second area 108(2) and the third area 108(3) within the environment 102 as an animal safe zone. Using the image data from the camera apparatuses 104(1)-(3), the remote system 120 can determine that the animal 126 is within the first area 108(1) of the environment 102. Since the animal 126 is within an animal notification zone of the environment 102, the remote system 120 can send a first message 130 to a driver device 132 of the driver 118 and a second message 134 to a user device 136 of the user 128.

The first message 130 can include one or more of an indication that the animal 126 is within the environment 102 (e.g., within a notification zone), a type of animal 126 that is within the environment 102, information on how to proceed with the delivery, an image of the environment 102 that includes an indication of the position of the animal 126 and/or an indication of a position for delivering the package (e.g., a delivery zone), or the like. For instance, in some instances, the information can specify that the driver 118 is to stop the delivery. In some instances, the information can specify that the driver 118 is to leave the package outside of the environment 102 (e.g., perform an outside delivery). Still, in some instances, the information can result in the delivery device outputting a query regarding whether the driver 118 still wants to proceed with performing the in-home delivery.

For instance, the driver device 132 can display content associated with the environment 102. The content can include an image of the environment 102 that indicates a current position of the animal 126, the indication of the type of animal, an indication of the time that it will take for the animal 126 to reach the main entrance 114, and/or the like. Based on the image, the driver 118 may determine that it is still safe to proceed with performing the in-home delivery. As such, the driver device 132 can receive input from the driver 118 indicating that it is still safe and based on the input, send a message to the remote system 120 indicating that the driver 118 still wants to proceed with the in-home delivery. The remote system 120 can receive the message from the driver device 132 and provide the driver 118 with access to the environment 102.

In some instances, to provide access to the driver, the remote system 120, sends a message to the locking apparatus 110 that causes the locking apparatus 110 to unlock the main entrance 114 for the driver 118. Additionally or alternatively, in some instances, the remote system 120 sends a message to one or more of the camera apparatuses 104(1)-(4) that instruct the one or more camera apparatuses 104(1)-(4) to provide the driver 118 with access to the environment 102. For instance, the camera apparatus 104(4) can receive a message from the remote system 120 to unlock the locking apparatus 110. The camera apparatus 104(4) can then send a message to the locking apparatus 110 that causes the locking apparatus to unlock the main entrance 114. In some instances, the camera apparatus 104(4) sends the message to the locking apparatus 110 using short-range communication, such as IEEE 802.15.4 (ZigBee), IEEE 802.15.1 (Bluetooth), IEEE 802.11 (WiFi), or any other PAN communication protocol.

Additionally, in some instance, the first message 130 can include contact information associated with the user 128. The driver 118 can then use the contact information to communicate with the user 128 in order to determine whether the driver 118 should still access the environment. For instance, the driver 118 can use the driver device 132 to send and receive message with the user driver 136 in order to inquire whether the driver 118 should still perform the in-home delivery even though the animal 126 was detected.

The second message 134 can include an indication that the animal 126 is within the environment 102 (e.g., within a notification zone), a message that the driver 118 is not going to perform the in-home delivery, a request to re-schedule the delivery, or the like. In some instances, the user 128 can use the user device 136 to send a message back to the remote system 120 indicating that the animal 126 is secure within the environment 102 and/or that the driver 118 should still perform the in-home delivery. Based on receiving the message the remote system can cause the locking apparatus 110 to unlock the main entrance 114 using as similar process as described above for the driver 118.

As illustrated in FIG. 1, the camera apparatus 104(1) (and similarly the camera apparatuses 104(2)-(4)) further include network interface(s) 138, processor(s) 140, and memory 142, which stores a controller 144. The controller 144 is configured to cause the camera apparatus 104(1) to start receiving image data (e.g., activate) and/or stop receiving image data (e.g., deactivate). Additionally, the controller 144 is further configured to cause the camera apparatus 104(1) to send image data to the remote system 120. For instance, the controller 144 can cause the camera apparatus 104(1) to both activate and send image data to the remote system 120 based on receiving messages from the remote system 120.

The locking apparatus 110 further includes network interface(s) 146, processor(s) 148, and memory 150, which stores controller 152. The controller 152 is configured to cause the locking mechanism 112 to move from a locked position to an unlocked position and/or from the unlocked position to the locked position. For instance, the controller 152 can cause the locking mechanism 112 to move from a locked position to an unlocked position based on the locking apparatus 110 receiving a message from an electronic device, such as one or more of the camera apparatus 104(1)-(4), the remote system 120, the driver device 132, the user device 136, or the like. The controller can further cause the locking mechanism 112 to move from the unlocked position to the locked position based on receiving an additional message from the electronic device.

Also illustrated in FIG. 1, the driver device 132 further includes processor(s) 154, network interface(s) 156, and memory 158, which stores application 160. User device 136 further includes processor(s) 162, network interface(s) 164, and memory 166, which stores application 168. In some instances, the driver device 132 can use the application 160 to send and receive notifications with the remote system 120 and/or the user device 136. Additionally, the user device 136 can use the application 168 to send and receive messages with the remote system 120 and/or the driver device 132.

As used herein, a processor (e.g., processor(s) 140, processor(s) 148, processor(s) 154, and processor(s) 162) may include multiple processors and/or a processor having multiple cores. Further, the processors may comprise one or more cores of different types. For example, the processors may include application processor units, graphic processing units, and so forth. In one implementation, the processor may comprise a microcontroller.

Memory (e.g., memory 142, memory 150, memory 158, and memory 166), may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) (e.g., processor(s) 140, processor(s) 148, processor(s) 154, and processor(s) 162) execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional modules are shown stored in the respective memories, the same functionality may alternatively be implemented in hardware, firmware, application specific integrated circuits, field programmable gate arrays, or as a system on a chip (SoC). In addition, while not illustrated, each respective memory discussed herein may include at least one operating system (OS) module that is configured to manage hardware resource devices such as the network interface(s), the I/O devices of the respective apparatuses, and so forth, and provide various services to applications or modules executing on the processors. Such OS module may implement a variant of the FreeBSD™ operating system as promulgated by the FreeBSD Project; other UNIX or UNIX-like variants; a variation of the Linux operating system as promulgated by Linus Torvalds; the Windows® operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 138, network interface(s) 146, network interface(s) 156, and network interface(s) 164 may enable communications between camera apparatus 104 (1), locking apparatus 110, delivery device 132, user device 136, respectively and other networked devices, such as remote system 120. Such network interface(s) can include one or more network interface controllers (NICs) or other types of transceiver devices to send and receive communications over a network.

For instances, each of the network interface(s) 138, network interface(s) 146, network interface(s) 156, and network interface(s) 164 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 138, network interface(s) 146, network interface(s) 156, and network interface(s) 164 may include a wide area network (WAN) component to enable communication over a wide area network.

The network 124 may represent an array or wired networks, wireless networks (e.g., WiFi), or combinations thereof. The remote system 120 may generally refer to a network-accessible platform—or "cloud-based service"—implemented as a computing infrastructure of processors, storage, software, data access, and so forth that is maintained and accessible via the network 124, such as the Internet. As such, the remote system may comprise one or more devices, which collectively may comprise a remote device. Cloud-based services may not require end-user knowledge of the physical location and configuration of the system that delivers the services. Common expressions associated with cloud-based services, such as the remote system 120, include "on-demand computing", "software as a service (SaaS)", "platform computing", "network accessible platform", and so forth.

In some instances, the remote system 120 may be local to the environment 102. For instance, the remote system 120 can be located within the environment 102. In some instances, some or all of the functionality of the remote system 120 may be performed by one of the camera apparatuses 104(1)-(3).

FIG. 2 is a schematic diagram of a second example of performing a delivery at the environment 102. In the example of FIG. 2, the environment 102 that includes the camera apparatus 104(1) and the locking apparatus 110. In the example of FIG. 2, the remote system 120 is configured to analyze the image data of the environment 102 during a specified time interval before a scheduled delivery in order to detect whether the user 128 (and/or any other person) is within the environment 102. Based on detecting the user 128, the remote system 120 is configured to send a message 130 to the driver device 132 and send a second message 134 to the user device 136 (not shown for illustrative purposes). The remote system 120 is further configured to cause the locking apparatus 110 to move to a locked position.

For instance, similar to the example of FIG. 1 above, the remote system 120 can determine a starting time for monitoring the environment 102 using a delivery time for a scheduled delivery at the environment 102. In some instances, the remote system 120 determine the starting time using a threshold period of time from the delivery time of the scheduled delivery. The remote system 120 can then send a message to the camera apparatuses 104(1)-(3) at the location that causes the camera apparatuses 104(1)-(3) to start sending image data to the remote system. In some instances, the camera apparatuses 104(1)-(3) send a constant stream of image data (e.g., a video data) to the remote system 120 while in some instances, the camera apparatuses 104(1)-(3) send image data to the remote system 120 at given time intervals. In some instance, the camera apparatuses 104(1)-(3) can send image data to the remote system 120 based on determining that the driver 118 is near to the environment 102.

The remote system 120 analyzes the image data from the camera apparatuses 104(1)-(3) using a similar process as described above. While analyzing the image data, the remote system 120 can detect that the user 128 is within the environment 102. The remote system 120 can further determine that a time at which the user 128 is detected within the environment 102 is within a threshold period of time of the delivery time for the scheduled delivery. In some examples, the remote system determines the threshold period of time using an object classifier associated with people.

Based on detecting the user 128, the remote system 120 can cause the locking apparatus 110 to move to a locked position if the locking apparatus 110 is currently in an unlocked position. For instance, the remote system can send an message to the locking apparatus 110 requesting the locking apparatus 110 to move the locking mechanism 112 from the locked position to the unlocked position. The remote system 120 can further send a first message 130 to the driver device 132. The first message 130 can include one or more of an indication that the user 128 is within the environment 102, information on how to proceed with the delivery, or the like. For instance, the information can specify that the driver 118 is to knock on the main entrance 114 of the environment 102 when the driver 118 arrives at the environment 102.

In some instances, the remote system further sends a second message 134 to the user device 136. The second message 134 can include an alert that the driver 118 is near to the environment 102 and a notification on how the driver 118 is going to proceed with the delivery. In some instances, the user 128 can receive the second message 134 and physically unlock the locking apparatus 110 for the driver 118. Additionally or alternatively, in some instances, the user 128 can use the user device 136 to send a message back to the remote system 120 that indicates that the driver 118 can still perform the in-home delivery. Based on receiving the message, the remote system can cause the locking apparatus 110 to unlock the main entrance 114 using a similar process as described above.

Also illustrated in FIG. 2, the environment includes an electronic device 202. In some instances, the remote system 120 can send a message 204 to the electronic device 202 based on detecting the user 128 within the environment. In some instances, the remote system 120 only sends the message 204 to the electronic device 202 based on determining that the user 128 is near the electronic device 202 (e.g., within the area 108(3) of the environment 102.

The message 204 can include an alert that the driver 118 is within proximity to the environment 102. For instance, the message 204 can indicate an estimated time that the driver 118 is going to arrive at the environment 102. In some instances, the message 204 can include an audio signal that the electronic device 202 outputs via speaker(s) 206. Additionally or alternatively, in some instances, the message 204 can include a message that the electronic device 202 displays to the user 128 via a display device.

In some instances, when the environment 102 includes the electronic device, 202, the remote system 120 can use an identifier associated with the electronic device 202 to determine a location of the user 128 within the environment 102. For instance, the remote system 120 can use the identifier to determine a position within the environment 102 of the electronic device 202 (e.g., the third area 108(3)). The remote system 120 can then determine that the user 128 is near to the position of the electronic device 202 based on detecting a voice of the user 128 received by the electronic device 202. In some instances, the remote system 120 can then use the determined position of the user 128 when monitoring the environment 102.

In the example of FIG. 2, the electronic device 202 further includes processor(s) 208, network interface(s) 210, and memory 212, which stores application 214. The processor(s) 208, network interface(s) 210, and memory 212 can respectively be similar to the processor(s), network interface(s), and memory described above. Additionally, the application 214 can configure the electronic device 202 to send and receive messages (e.g., notifications, or the like) with other electronic devices, such as the remote system 120.

It should be noted that, in some instances, the remote system 120 can detect people other than the user 128 within the environment 102. For instance, the remote system 120 can detect a family member and/or a guest of the user 128 within the environment 102. In some examples, when detecting a person other than the user 128 within the environment 102, the remote system 120 can perform a similar process as described above for the user 128. Additionally or alternatively, in some instances, when detecting a person other than the user 128 within the environment 102, the remote system 120 may send different notifications to the driver 118 and/or the user 128.

For instance, the remote system 120 may send a message to the user device 134 indicating that a person other than the user is within the environment 102. The message can further ask the user 128 whether he/she would like to continue with the scheduled delivery. In some instances, the user 128 can use the user device 134 to send a message back to the remote system 120 instructing the remote system 120 to cancel the scheduled delivery. Based on receiving the message, the remote system 120 can send a message to the driver device 132 that notifies the driver 118 that a person other than the user 128 is within the environment 102. The message can further include information for the driver 118 to cancel the delivery at the environment 102.

It should further be noted that, in some instances, each of driver device 132 and user device 134 can represent any type of electronic device having one or more processors and one or more memories. Such electronic devices can include a variety of categories or classes of devices, such as traditional client-type devices, desktop computer-type devices, mobile devices, special purpose-type devices, embedded-type devices, and/or wearable-type devices.

Finally, FIGS. 1 and 2 describe an example environment 102 that includes a structure, such as a house, business, or some other type of structure. In some instances, the environment can include areas beyond the structure. For instance, in some examples, the environment can include the structure (e.g., the house) along with a yard surrounding the structure. In such examples, the environment may be secure by a fence and/or gate that surrounds at least a portion of the environment. The fence or gate can correspond to the entrance of the environment from FIGS. 1 and 2. For instance, to provide access to the environment, the remote system may cause a locking apparatus on the fence and/or gate to unlock such that the delivery driver can enter.

Additionally or alternatively, in some instances, the environment may not include a structure, such as a home. For example, the environment can include an area of land that is at least partially secure by a gate and/or fence (e.g., the entrance from FIGS. 1 and 2). In such examples, the remote system may provide the delivery driver access to the environment (e.g., the area of land) by unlocking a locking apparatus associated with the fence and/or gate.

Figure 3:
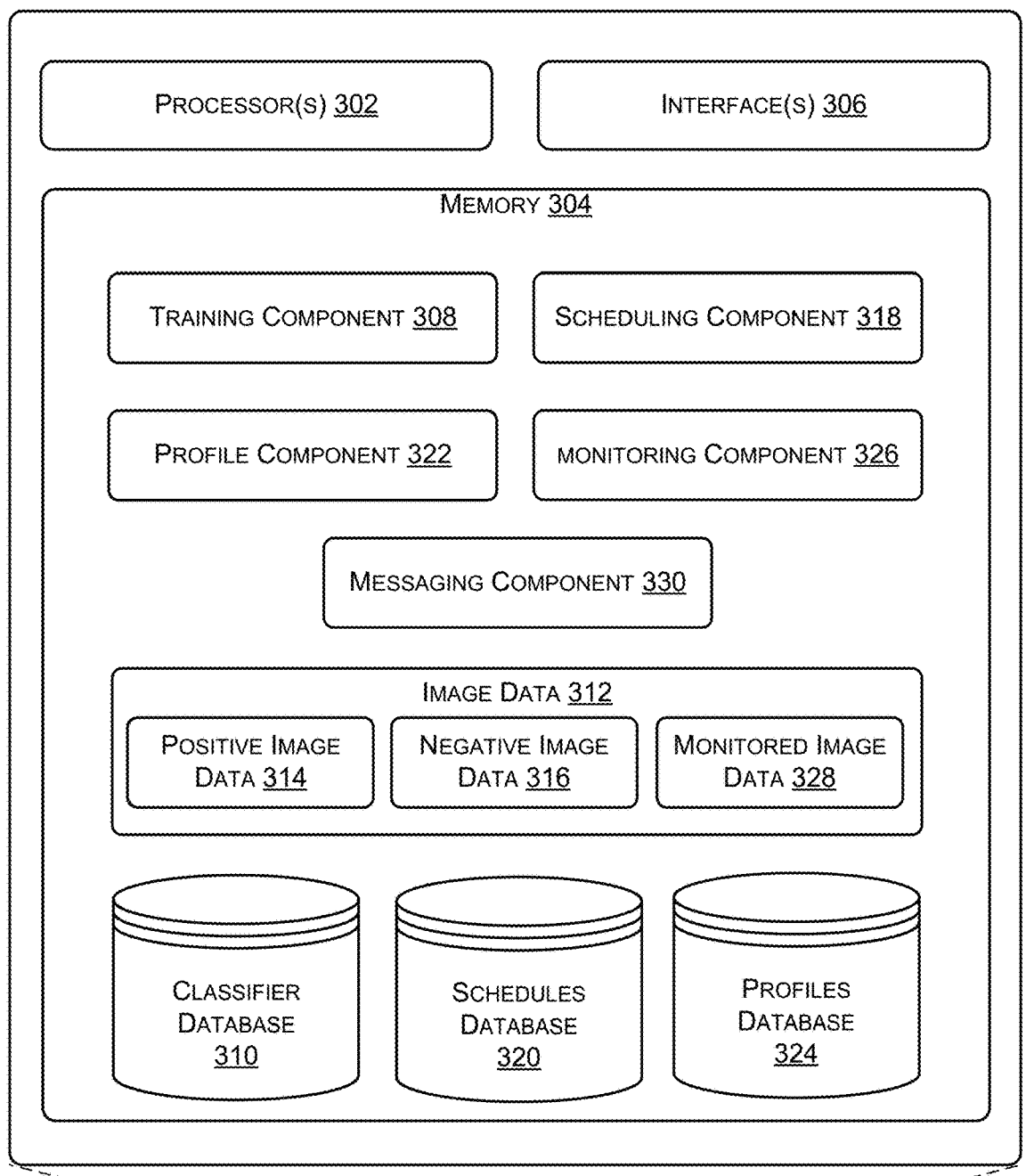
FIG. 3 is a block diagram illustrating relevant functional components of the network accessible resource(s) of the remote system.

FIG. 3 is a block diagram illustrating relevant functional components of the network accessible resource(s) 122 of the remote system 120. In some instances, the network accessible resource(s) 122 may include other components not shown in FIG. 3.

Logical functionality of the remote system 120 may be implemented by one or more processor(s) 302, associated memory 304, and software that is stored in the memory 304 and executed by the processor(s) 302. As discussed above, the processor(s) 302 may include multiple processors and/or a processor having multiple cores. Further, the processor(s) 302 may comprise one or more cores of different types. For example, the processor(s) 302 may include application processor units, graphic processing units, and so forth. In one implementation, the processor(s) 302 may comprise a microcontroller.

The memory 304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 304 may be implemented as computer-readable storage media ("CRSM"), which may be any available physical media accessible by the processor(s) 302 execute instructions stored on the memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional modules are shown stored in the memory 304, the same functionality may alternatively be implemented in hardware, firmware, application specific integrated circuits, field programmable gate arrays, or as a system on a chip (SoC). In addition, while not illustrated, each respective memory discussed herein may include at least one operating system (OS) module that is configured to manage hardware resource devices such as the network interface(s), the I/O devices of the respective apparatuses, and so forth, and provide various services to applications or modules executing on the processor(s) 302. Such OS module may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 306 may include can include one or more network interface controllers (NICs) or other types of transceiver devices to send and receive communications over a network. For instance, network interface(s) 306 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 306 may include a wide area network (WAN) component to enable communication over a wide area network.

The remote system 120 can include a training component 308 for training object classifiers stored in the classifier database 310. In some instances, the training component 308 trains the object classifiers using image data 312. For instance, to train an object classifier for an object (e.g., an animal, person, item, etc.), the training component 308 can receive image data (e.g., positive image data 314) corresponding to images that include the object and image data (e.g., negative image data 316) corresponding to images that do not include the object. The training component 308 can then use the positive image data 314 and the negative image data 316 to train the object classifier using one or more machine learning algorithms.

In some instances, the training component 308 creates one or more object classifiers that are specific to an environment, such as environment 102. For instance, the training component 308 can receive positive image data 314 and negative image data 316 from various locations within the environment. The training component 308 can then use the positive image data 314 and the negative image data 316 to train the one or more object classifiers that are specific to the environment. For instance, the training component 308 can create an object classifier for each type of object (e.g., a person, dog, cat, etc.) that is within the environment.

In some instances, the user provides the remote system 120 with a list of objects within the environment. The training component 308 can then use the list of objects in order to create an object classifier for each object. Additionally or alternatively, in some instances, the training component 308 can identify different objects within the environment using the positive image data 314 and the negative image data 316. The training component 308 can then create an object classifier for each identified object.

In some instances, the training component 308 creates object classifiers that the remote system 120 uses for multiple environments. For instance, the training component 308 can receive positive image data 314 and negative image data 316 from multiple environments. The training component can then use the position image data 314 and the negative image data 316 to train object classifiers for each of the objects detected within the environments.

In some instances, the remote system 120 further determines a threshold period of time for monitoring an object associated with a created object classifier, and then associate the threshold period of time with the created object classifier. In some instances, the remote system 120 can determine the threshold period of time based on a type of object. For instance, the remote system 120 can use a greater threshold period time for animals than for people. In some instances, the remote system 120 can receive the threshold period of time from another source. For instance, a user that occupies an environment can provide the remote system 120 with a threshold period of time for each object within the environment.

In some instances, the remote system 120 uses a similar process as described above for object classifiers to create one or more classifiers for unfavorable conditions within the environment. For instance, the remote system 120 can create classifiers for fires, flooding, or the like.

The remote system 120 can further include a scheduling component 318 for creating records (e.g., data) for scheduled services (e.g., scheduled deliveries) stored in the schedules database 320. For instance, the remote system 120 can receive information associated with a scheduled service. The information can include a service location, a scheduled service time, an identity of the user, contact information for the user (e.g., phone number, email, etc.), an identity of a guest performing the service, contact information for the guest (e.g., phone number, email, etc.), information identifying the device of the guest (e.g., MAC address, etc.), or the like. The scheduling component 318 can then use the information associated with the scheduled service to create a record for the scheduled service. After creating the record, the scheduling component 318 can store the record for the scheduled service in the schedules database 320.

The remote system 120 can further include a profile component 322 for creating user profiles stored in the profiles database 324. For instance, the remote system 120 can receive information associated with a user. The information can include an identity of the user, contact information for the user (email address, phone number for a user device, etc.), a location of an environment associated with the user, identities of people that occupy the environment, a list of animals that occupy the environment, designations associated with different locations within the environment (e.g., animal safe zone or animal notification zone), content/ watch history, order/purchase history for online shopping, location/GPS history, speaker ID profile, or the like. The profile component 322 can then use the information associated with the user to create a user profile for the user. After creating the user profile, the profile component 322 can store the user profile in the profiles database 324.

In some instances, the remote system 120 can use the profile component 322 to create an account that includes multiple user profiles. For instance, the remote system 120 can use the profile component 322 can create an account for an environment using data associated with the environment. The data can include a location of the environment (e.g., home address), contact information (e.g., home phone number) for the environment, payment information (e.g., credit card number), or the like. The remote system 120 can then use the profile component 322 to create user profiles for one or more occupants (e.g., users) within the environment.

A user profile for an occupant can include information that is associated with the occupant. For instance, the user profile can include information such as an identity of the occupant, contact information for the occupant (email address, phone number for a user device, etc.), content/ watch history, order/purchase history for online shopping, location/GP S history, speaker ID profile, or the like. The remote system 120 can then store the user profiles for the one or more occupants within the account for the environment.

The remote system 120 can further include a monitoring component 326 for monitoring environments. For instance, the remote system 120 can use the monitoring component 326 to determine when to monitor an environment for objects. To determine when to monitor an environment, the monitoring component 326 can analyze a record of a scheduled service from the schedules database 320 to determine a scheduled time for the service and scheduled location for the service. Additionally, in some instances, the monitoring component 326 can analyze a user profile associated with the scheduled service (e.g., user profile of the user) in order to identify objects that may be within the environment. Using the scheduled time for the service and the user profile, the monitoring component 326 can determine a starting time for monitoring the environment.

For instance, the monitoring component 326 can determine that one or more animals occupy the environment. For each animal, and using an object classifier for the respective animal, the monitoring component 326 can determine a starting time for monitoring the environment. Based on the starting times for the animals, the monitoring component 326 can cause the remote system 120 to send a request for monitored image data 328 to one or more camera apparatus within the environment. The monitored image data 328 can include images and/or a video feed of the environment associated with the scheduled delivery.

In some instances, the monitoring component 326 monitors the monitored image data 328 between the starting time and the time of the scheduled service (and/or when the guest arrives at the environment). To monitor the environment, the monitoring component 326 can analyze the monitored image data 328 to detect objects within the environment. For instance, the monitoring component 326 can use initial image data from the monitored image data 328 to create a background image of the environment. The monitoring component 326 can then process the monitored image data 328 using the background image. For instance, the monitoring component 326 can subtract the background image from images associated with the monitored image data 328 in order to detect an object within the environment. The monitoring component 326 can then analyze the object using the one or more object classifiers in order to determine a type of object (e.g., a person or animal, such as a dog, cat, etc.) within the environment.

It should be noted that, in some instances, the monitoring component 326 can use other image processing techniques for detecting objects within the environment. For instance, the monitoring component 326 can use edge detection, image analysis, noise filters, math processing, convolution, trend removal, enhancement, or the like to detect objects within the monitored image data 326. The monitoring component 326 can then use the object classifiers stored in the classifier database 310 to determine the type of the object within the environment.

In some instances, after detecting an object within the environment, the monitoring component 326 can further track the object. For instance, the monitoring component 326 can track the object from a time of the detection to the scheduled time for the service (and/or when the guest arrives at the environment). In some instances, when the object includes an animal, the monitoring component 326 tracks the object to determine whether the object moves from an animal notification zone to a safe zone and/or from a safe zone to an animal notification zone within the environment. In some instances, when the object includes an animal or a person, the monitoring component 326 tracks the object to determine whether the object exits the environment before the scheduled delivery.

In some instances, the monitoring component 326 can further detect unfavorable conditions within the environment. For instances, the monitoring component 326 can use the classifiers for the unfavorable conditions to detect the unfavorable conditions using a similar process as objects described above. Additionally, in some instances, the monitoring component 326 can detect unfavorable conditions using other techniques, such as one or more sensors within the environment. For instance, the monitoring component 326 may receive a message indicating a unfavorable condition from a camera apparatus (or other electronic device) within the environment that detects unfavorable conditions using sensors. For instance, the camera apparatus (or other electronic device) may include sensors that detect fires, low light situations, gas, water, or the like. The camera apparatus (or other electronic device) can then send the message to the remote system 120 based on detecting a unfavorable condition using the sensors.

The remote system 120 can further include a messaging component 330 for sending messages to the guest and the user. For instance, after the monitoring component 326 detects an object within the environment, the messaging component 330 can generate and send messages to various electronic devices. For instance, the messaging component 330 can generate the first message 130 for the guest and the second message 134 for the user. The messaging component 330 can then cause the remote system 120 to send the first message to the guest and send the second message to the user.

Figure 4:
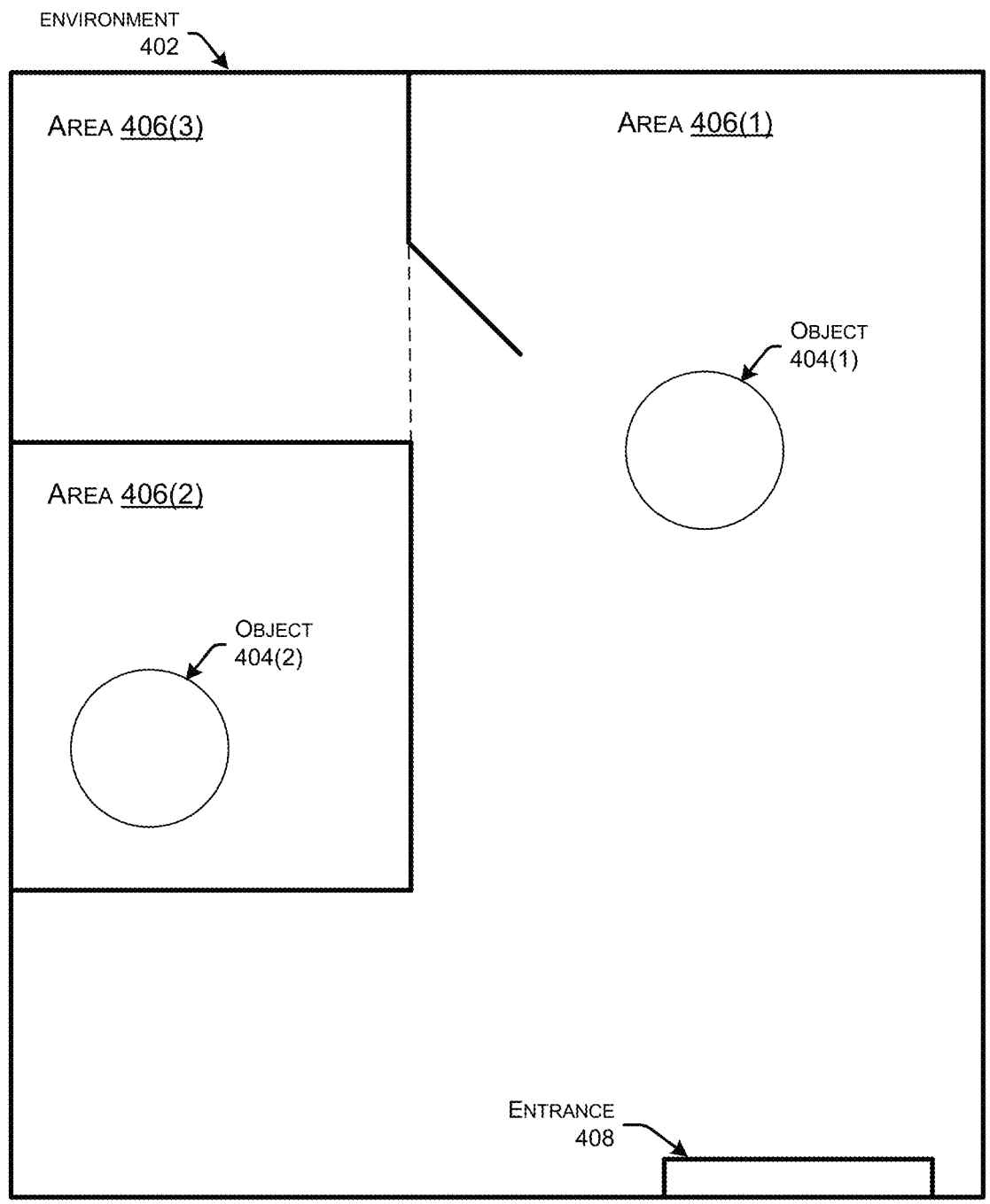
FIG. 4 is a schematic diagram of an example of a remote system detecting objects within an environment.

FIG. 4 is a schematic diagram of an example of a remote system detecting objects within an environment 402. For instance, in the example of FIG. 4, the environment 402 includes three separate areas 406(1)-(3) (e.g., areas, such as rooms). In some instances, each of the areas 406(1)-(3) may be monitored by one or more camera apparatus that capture image data of the respective location. As illustrated, the remote system detects a first object 404(1) in the first area 406(1) and a second object 404(2) in the second area 406(2).

In some instances, the remote system can determine whether to notify a guest of the objects 404(1)-(2) within the environment 402 based on the positions of the objects 404(1)-(2). For instance, the remote system may determine that each of the objects 404(1)-(2) includes an animal. The remote system can further determine that the first animal (e.g., object 404(1)) is within an animal notification zone of the environment 402 since the first animal has access to the entrance 408, and that the second animal (e.g., object 404(2)) is within an animal safe zone of the environment 402 since the second animal does not have access to the entrance. Based on the determinations, the remote system may send a message to the guest indicating that the first animal is not secure. In some instances, the message may further specify the type of animal.

In some instances, the remote system may detect objects 402(1)-(2) other than animals. For instance, the remote system may determine that each of the objects 402(1)-(2) includes an item, such a jewelry. The remote system may then determine that the first piece of jewelry (e.g., object 404(1)) is not secure since the guest can see the first piece of jewelry from the entrance, and that the second piece of jewelry (e.g., object 404(2)) is secure since the second piece of jewelry is locked in the second location 404(2). Based on the determinations, the remote system may send a message to the device of the guest indicating that the remote system will not provide access to the environment 402.

Figure 5:
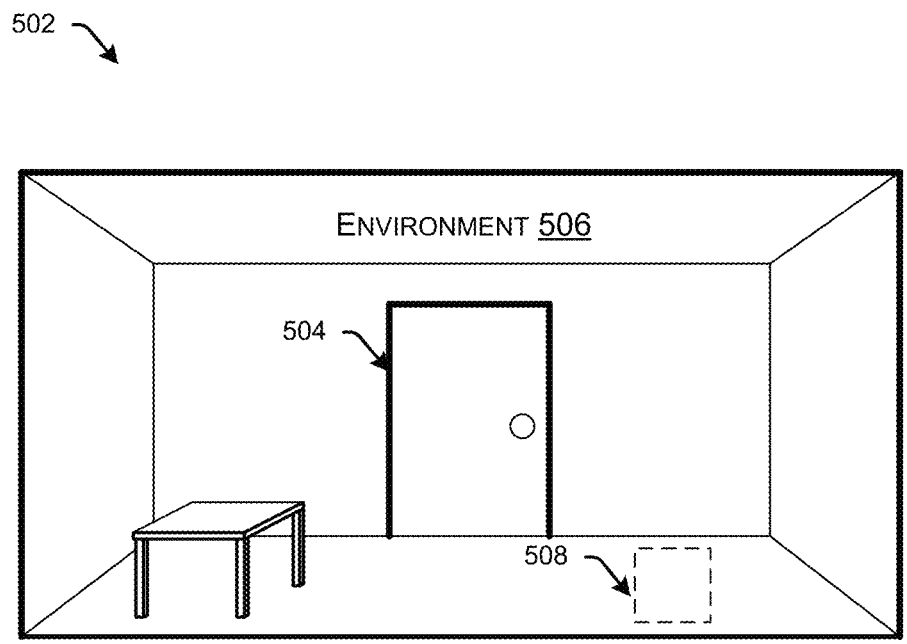
FIG. 5 is a schematic diagram of an example user interface of a device that a user may use to send a delivery driver a location for performing an in-home delivery.

FIG. 5 is a schematic diagram of an example user interface 502 of a user device that a user may use to inform a delivery driver with a position (e.g., zone) for performing an in-home delivery. For instance, in the example of FIG. 5, the remote system may receive image data from a camera apparatus located at an entrance 504 of an environment 506. The remote system may then send the image data to a device associated with a user. Based on receiving the image data, the device of the user can use the image data to generate the user interface 502. For instance, in FIG. 5, the user interface 502 includes an image of the entrance 504 of the environment 506.

In some instances, the user can then use the user interface 502 to specify a position within the environment in which a delivery driver is to perform an in-home delivery (e.g., drop packages off). In some instances, the device receives input from the user corresponding to the position within the environment 506 for performing the in-home delivery. For instance, in the example of FIG. 5, the user draws a zone 508 around the position in which the user wants the delivery driver to leave the package.

Figure 6:
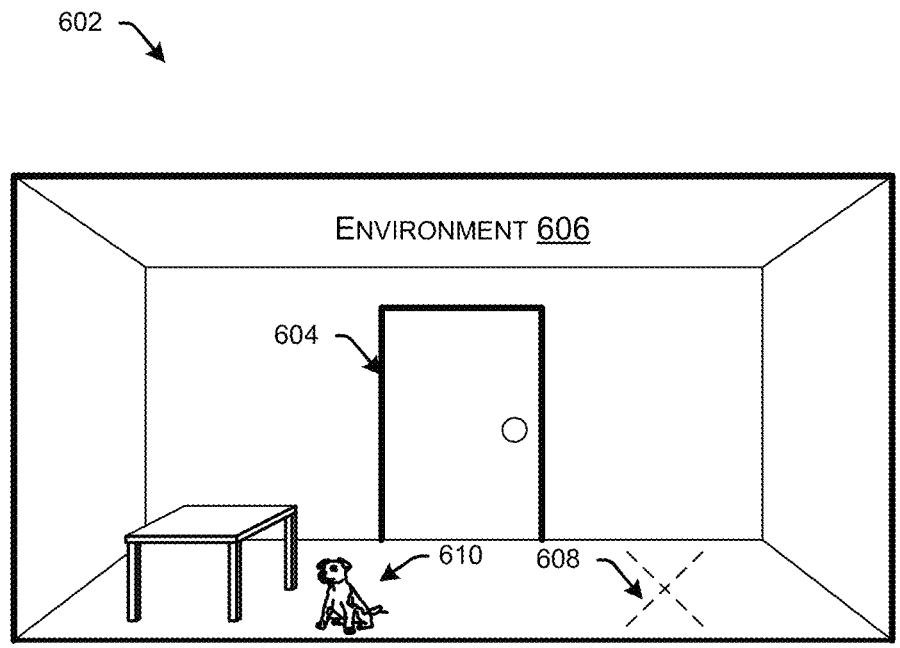
FIG. 6 is a schematic diagram of an example user interface that a remote system may send to a delivery driver performing an in-home delivery.

FIG. 6 is a schematic diagram of an example user interface 602 that a remote system may present to a delivery driver performing an in-home delivery. For instance, in the example of FIG. 6, the remote system may receive image data from a camera apparatus located at an entrance 604 of an environment 606 at a time the delivery driver arrives at the environment 606. The remote system may then send the image data to a device associated with delivery driver. Based on receiving the image data, the device of the delivery driver can use the image data to generate the user interface 602. For instance, in FIG. 6, the user interface 602 includes an image of the entrance 604 of the environment 606.

In some instances, the user interface 602 further indicates the position 608 (e.g., zone) for performing the in-home delivery, which may represent the position 508 indicated by the user in FIG. 5. Additionally, the user interface 602 illustrates a position of an object 610 within the environment 606. In some instances, the delivery driver can use the user interface 602 to determine whether to proceed with the in-home delivery, or whether to perform an outdoor delivery (e.g., leave the package outside of the environment 606).

Figure 7:
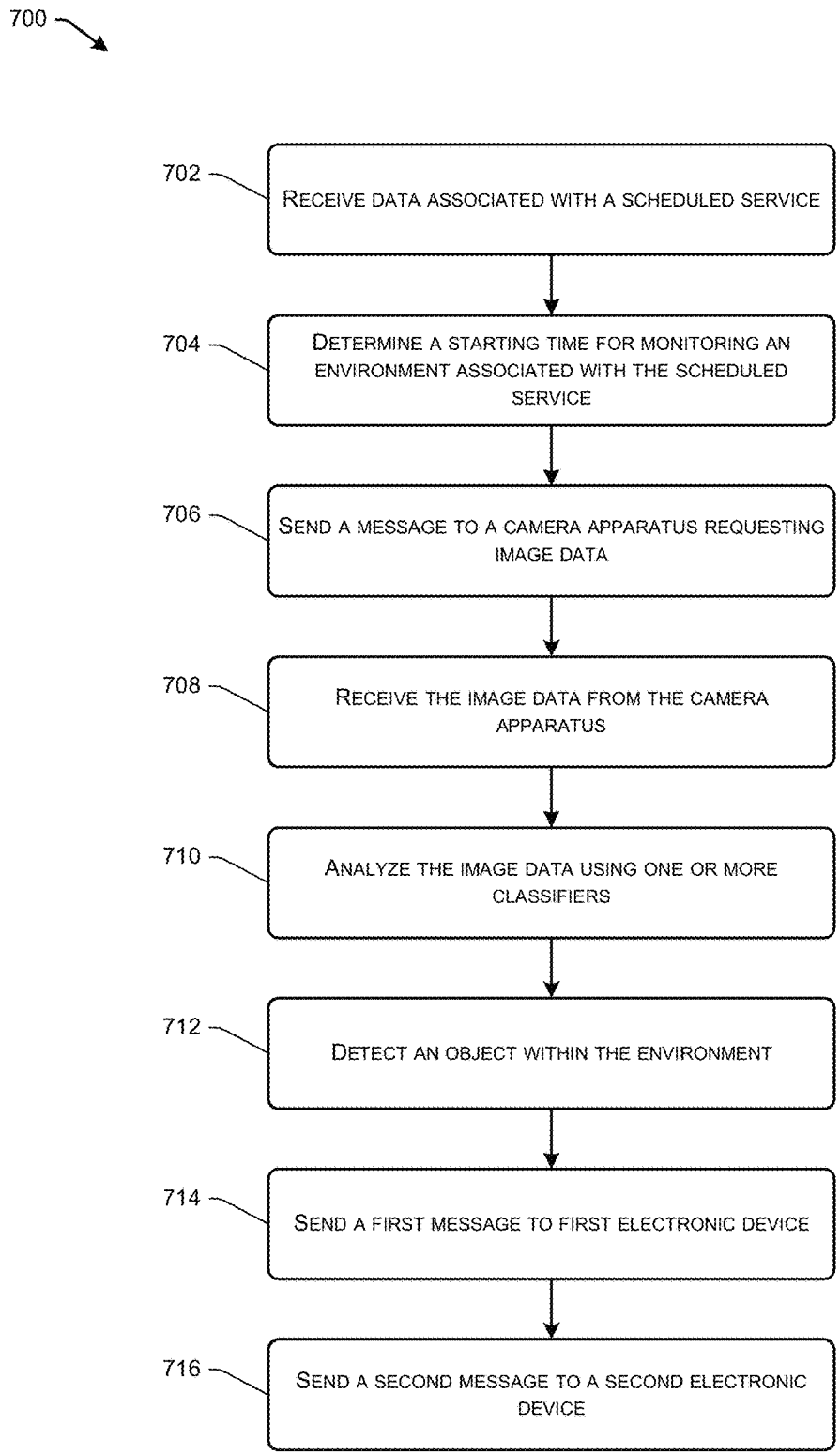
FIG. 7 illustrates a flow diagram of an example process for performing computer vision for manual services.

FIG. 7 illustrates a flow diagram of an example process 700 for providing computer vision-based alerts for an in-home delivery. This process (as well as each process described herein) is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the operations performed in the processes 700-1200 are performed by the remote system 120. In some instances, the operations performed by the processes 700-1200 can be performed by another electronic device, such as the camera apparatus 104(1).

At 702, the remote system 120 receives data associated with a scheduled service. In some instances, the remote system 120 can retrieve the data associated with the scheduled service from a schedules database. In some instances, the remote system 120 can receive the data associated with the scheduled service from an electronic device, such as an online marketplace. The data associated with the scheduled service can indicate, among other things, a location of the service and a scheduled time for the service.

At 704, the remote system 120 determines a starting time for monitoring an environment associated with the scheduled service. For instance, the remote system 120 can determine a starting time for analyzing image data associated with the environment. In some instances, the remote system 120 can use the scheduled time for the service to determine the starting time for monitoring the image data. For instance, the remote system 120 can determine the starting time based on a threshold period of time before the scheduled time for the service. In some instances, the remote system 120 determines the threshold period of time using one or more object classifiers for objects that may occupy the environment. Additionally or alternatively, in some instances, the remote system 120 can determine the starting time based on detecting that a guest associated with the scheduled service is near the environment.

At 706, the remote system 120 sends a message to a camera apparatus requesting image data. For instance, the remote system 120 can send the message to the camera apparatus at the starting time for monitoring the environment. The message can cause the camera apparatus to start capturing image data within the environment, and then send the image data to the remote system 120.

At 708, the remote system 120 receives the image data from the camera apparatus. In some instances, the image data can include video data that the remote system 120 receives from the camera apparatus. For instance, the remote system 120 can receive the video image data from the camera apparatus from the starting time for monitoring the environment until the scheduled time of the service. Additionally or alternatively, in some instances, the image data can include still image data that the remote system 120 receives from the camera apparatus. For instance, the remote system 120 can receive still image data corresponding to an image within the environment at different time intervals.

At 710, the remote system 120 analyzes the image data using one or more classifiers. For instance, the remote system 120 can store object classifiers for different objects (and/or classifiers for unfavorable conditions) in a classifier database. In some instances, a classifier can be associated with a specific object, such as a person or type of animal, and include characteristics representing the specific object. For instance, characteristics can include one or more of a size of the object, a shape of the object, a color of the object, or the like. In some instances, to analyze the image data, the remote system 120 uses one or more image processing techniques to identify objects within the image data. The remote system 120 then compares the objects within the image data to one or more classifiers from the classifier database.

At 712, the remote system 120 detects an object within the environment. For instance, based on analyzing the image data, the remote system 120 can determine that an object is within the environment. In some instances, the object can include an animal within the environment. In some instances, the object can include a person within the environment. Additionally or alternatively, in some instance, the object can include an item within the environment. The remote system 120 continue to track the object using the image data after detecting the object. For instance, the remote system 120 can track the object using the image data until the guest associated with the scheduled service arrives at the environment.

At 714, the remote system 120 sends a first message to a first electronic device. For instance, the remote system 120 can send a message to a device of a guest associated with the scheduled service (e.g., device associated with the scheduled service) that indicates that the object is within the environment. Based on the scheduled service including an in-home delivery, the message can further include information on how to proceed with the scheduled delivery. For instance, the message can indicate that the delivery driver should leave a package outside of the environment.

At 716, the remote system sends a second message to a second electronic device. For instance, the remote system 120 can send a message to a device of a user (e.g., a customer) that is associated with the scheduled service and/or the environment. In some instances, the message can indicate that the object is within the environment. Additionally, the message can indicate that the guest is within proximity of the environment for performing the in-home service.

In some instances, in addition to or alternatively from detecting the object, the remote system 120 can detect an unfavorable condition within the environment. For instance, the remote system 120 can detect a fire, floor, low lighting, or the like within the environment. In some instances, the remote system 120 detects the unfavorable condition using a classifier. In some instances, the remote system 120 detects the unfavorable condition using one or more sensors within the environment. The remote system 120 can then send notifications to the device of the guest and the device of the user based on detecting the unfavorable condition.

Figure 8:
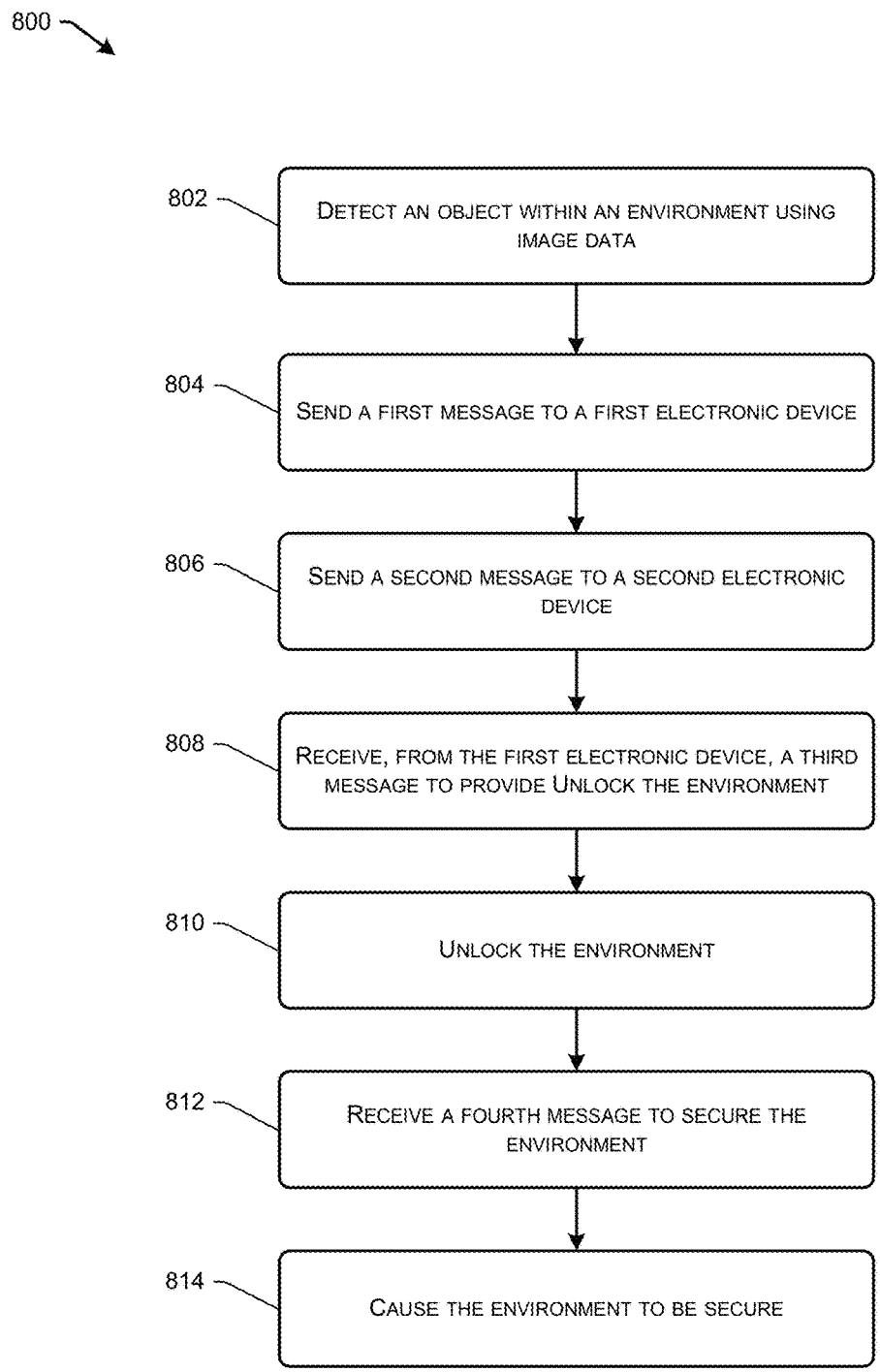
FIG. 8 illustrates a flow diagram of an example process for providing messages based on detecting an object within an environment.

FIG. 8 illustrates a flow diagram of an example process 800 for providing computer vision-based notification based on detecting an object within an environment. In some instances, operations 802-806 from example process 800 can represent operations 712-714 from example process 700. For instance, the operations 802-814 from example process 800 can occur after operations 702-710 from example process 700.

At 802, the remote system 120 detects an object within an environment using image data. As discussed above, in some examples, the remote system 120 can use one or more image processing techniques to detect objects within the environment. Objects can include people, animals, items, or the like. For instance, in some examples, the object can include an animal. Based on the object including an animal, the remote system 120 may determine that the animal is within a designated animal notification zone of the environment.

At 804, the remote system 120 sends a first message to a first electronic device. For instance, the remote system 120 can send a message to a device of a guest associated with a scheduled service at the environment. The message can indicate that an object, such as an animal, person, item or the like, is within the environment. In some instances, the message can further include an image captured within the environment that indicates a position of the object within the environment.

For instance, if the object is an animal and the in-home service includes an in-home delivery, the remote system 120 can send a message to a device of a delivery driver performing the in-home delivery. The message can indicate that the animal is within the environment. In some instances, the message can further include an image of the environment that indicates a position of the animal within the environment.

At 806, the remote system 120 sends a second message to a second electronic device. For instance, the remote system 120 can send a message to a device of the user that indicates that the object is within the environment. In some instances, the message can further include an image captured within the environment that indicates a position of the object within the environment. For instance, if the object includes an animal, the remote system 120 can send the device of the user a message indicating that the animal is unsecure within the environment. The message can further include an image within the environment indicating a position of the animal.

At 808, the remote system 120 receives, from the first electronic device, a third message to unlock the environment. For instance, the remote system 120 can receive a message from the device of the guest that indicates that the guest wants to proceed with the in-home service. In some instances, the guest can determine to proceed with the in-home service based on the message received from the remote system 120.

For instance, if the object is an animal and the in-home service includes an in-home delivery, the delivery driver may determine that he or she still wants to perform the in-home delivery. In some instances, the delivery driver may make the determination based on the type of animal, a position of the animal within the environment (e.g., within a locked location, a far distance from the delivery entrance), or the like. Based on the determination, the remote system 120 can receive a message from the device of delivery driver that indicates that the delivery driver is going to proceed with the in-home delivery.

At 810, the remote system 120 unlocks the environment. For instance, based on receiving the message from the first electronic device, the remote system 120 can send a message instructing the locking apparatus to unlock the entrance of the environment. In some instances, the remote system 120 sends the message to the camera apparatus, which in turn sends the message and/or an additional message to the locking apparatus that causes the locking apparatus to unlock the entrance. In some instances, the remote system 120 sends the message to the locking apparatus.

At 812, the remote system 120 receives a fourth message to secure the environment. For instance, the remote system 120 can receive a message that includes a request to lock the environment. In some instances, the remote system 120 can receive the message from the device of the guest when the guest is finished performing the in-home service. In some instances, the remote system 120 can receive the message from the camera apparatus when the guest is finished with performing the in-home service.

At 814, the remote system 120 causes the environment to be secure. For instance, based on receiving the message to secure the environment, the remote system 120 can send a message instructing the locking apparatus to lock the entrance of the environment. In some instances, the remote system 120 sends the message to the camera apparatus, which in turn sends an additional message to the locking apparatus to lock the entrance. In some instances, the remote system 120 sends the message to the locking apparatus.

Figure 9:
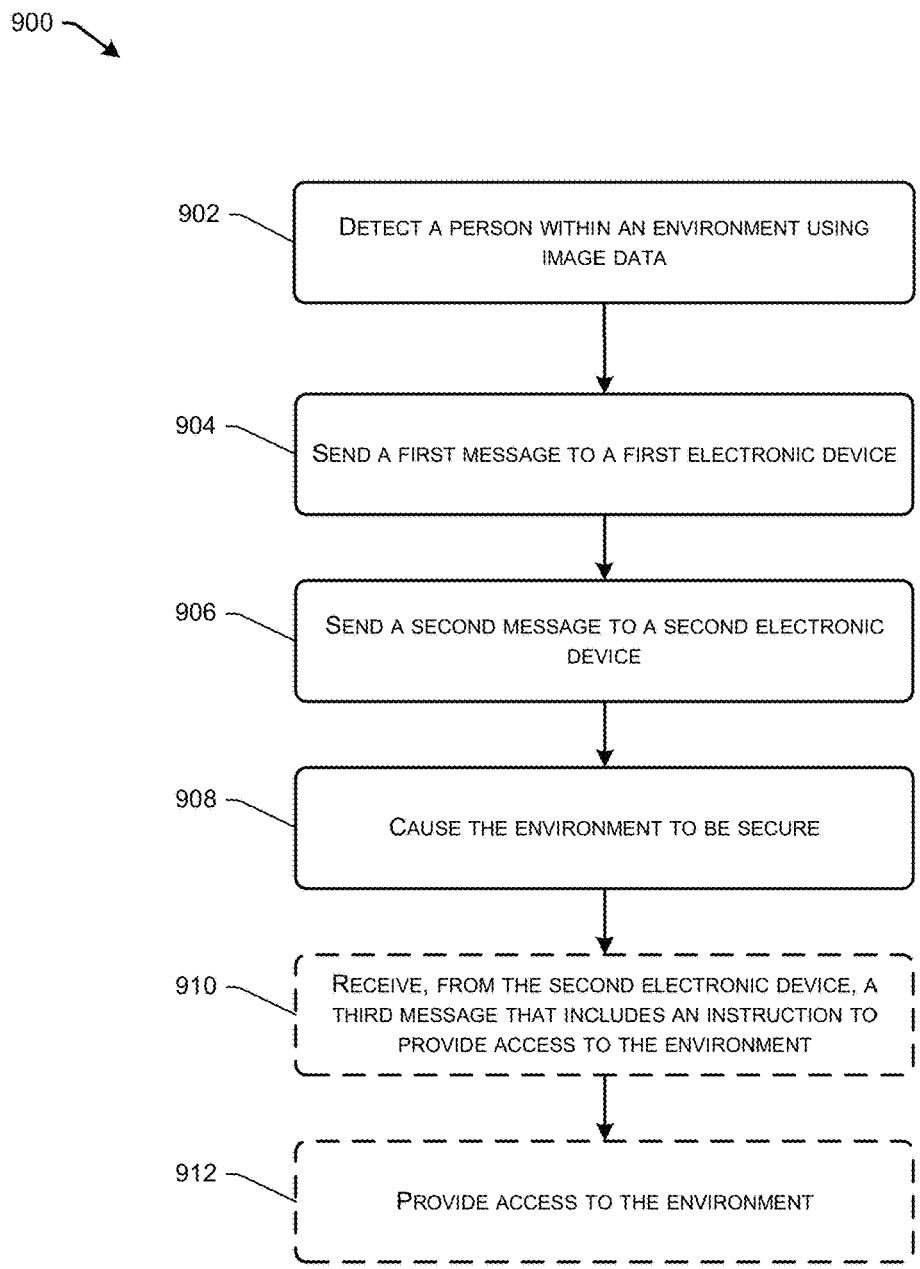
FIG. 9 illustrates a flow diagram of an example process for providing messages based on detecting a person within an environment.

FIG. 9 illustrates a flow diagram of an example process 900 for providing computer vision-based messages based on detection of a person. In some instances, operations 902-906 from example process 900 can represent operations 712-714 from example process 700. For instance, the operations 902-912 from example process 900 can occur after operations 702-710 from example process 700.

At 902, the remote system 120 detects a person within an environment using image data. As discussed above, in some examples, the remote system 120 can use one or more image processing techniques to detect the person within the environment. In some examples, the remote system further determines that a time associated with the detection is within a threshold period of time of a scheduled service (e.g., a scheduled delivery).

At 904, the remote system sends a first message to a first electronic device. For instance, the remote system 120 can send a message to a device of a guest associated with a scheduled service at the environment. The message can indicate that a person is within the environment. In some instances, when the scheduled service includes scheduled delivery, the message can further include information to perform an outside delivery (e.g., not an in-home delivery).

At 906, the remote system 120 sends a second message to a second electronic device. For instance, the remote system 120 can send a message to a device of the user that indicates that the person was detected within the environment. In some instances, the message can include an identity of the person within the environment.

At 908, the remote system 120 causes the environment to be secure. For instance, based on detecting the person within the environment, the remote system 120 can send a message instructing the locking apparatus to lock an entrance of the environment. In some instances, the remote system 120 sends the message to the camera apparatus, which in turn sends an additional message to the locking apparatus to lock the entrance. In some instances, the remote system 120 sends the message to the locking apparatus.

Optionally, at 910, the remote system 120 receives, from the second electronic device, a third message that includes a request to provide access to the environment. For instance, the user may decide that he/she would like the guest to still perform the in-home service. As such, the remote system 120 can receive a message from the device of the user indicating that the user still wants the in-home service. In some instances, based on receiving the message, the remote system 120 sends a message to the device of the guest that instructs the guest to continue with the in-home delivery.

For instance, if the scheduled service includes a scheduled delivery, the user can determine that he/she want the delivery driver to perform the in-home delivery. As such, the remote system 120 can receive a message to perform the in-home delivery from the device of the user. In some instances, based on receiving the message, the remote system 120 can send the device of the delivery driver a message that instructs the delivery driver to continue with the in-home delivery.

Additionally, at 912, the remote system 120 provides access to the environment. For instance, based on receiving the message from the second electronic device, the remote system 120 can send a message instructing the locking apparatus to unlock the entrance of the environment. In some instances, the remote system 120 sends the message to the camera apparatus, which in turn sends an additional message to the locking apparatus that causes the locking apparatus to unlock the entrance. In some instances, the remote system 120 sends the message to the locking apparatus.

Figure 10:
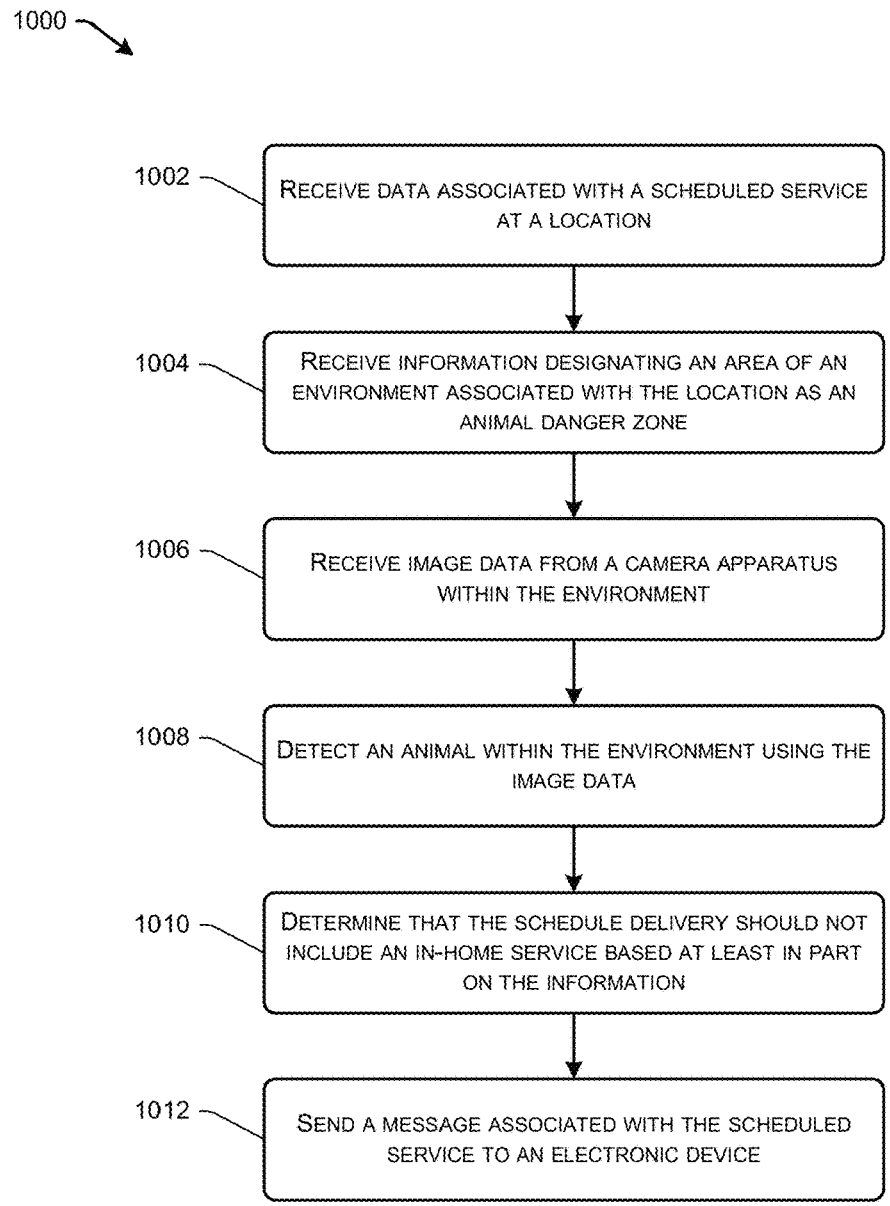
FIG. 10 illustrates a flow diagram of an example process for designating areas within an environment as designated animal zones. The example process further sends a message to a guest based on the designations.

FIG. 10 illustrates a flow diagram of an example process 1000 for designating areas within an environment as animal safe zones and animal notification zones.

At 1002, the remote system 120 receives data associated with a scheduled service at a location. In some instances, the remote system 120 can retrieve the data associated with the scheduled service from a schedules database. In some instances, the remote system 120 can receive the data associated with the scheduled service from an electronic device, such as an online marketplace. The data associated with the scheduled service can indicate, among other things, a location for the service, a scheduled time for the service. For instance, if the scheduled service includes a scheduled delivery, the data can indicate a delivery location and a delivery time.

At 1004, the remote system 120 receives information designating an area of an environment associated with the location as an animal notification zone. For instance, the remote system 120 can receive a message from a device associated with a user of the scheduled service that designates areas (e.g., rooms, zones, etc.) within the environment as animal safe zones and animal notification zones. As discussed above, an animal safe zone can include an area within the environment in which the animal is secure. For instance, the animal safe zone can correspond to a secured room, kennel, and/or other secure area within the environment in which the animal does not have access to a zone (e.g., area, room, etc.) in the environment where an in-home service is being performed. An animal notification zone can include an area within the environment in which the animal is unsecure. For instance, the animal notification zone can correspond an area within the environment in which the animal does have access to the zone in the environment where the in-home service is being performed.

At 1006, the remote system 120 receives image data from a camera apparatus within the environment. For instance, the remote system 120 can send a message to the camera apparatus requesting the image data. In some instances, the image data can include a video data that the remote system 120 continuously receives from the camera apparatus. Additionally or alternatively, in some instances, the image data can include still image data that the remote system 120 from the camera apparatus.

At 1008, the remote system 120 detects an animal within the environment using the image data. For instance, the remote system 120 can analyze the image data using one or more image processing techniques in order to detect the animal within the environment. In some instances, after detecting the animal within the environment, the remote system 120 can track the animal within the environment using the image data.

At 1010, the remote system 120 determines that the scheduled service should not include an in-home service based at least in part on the information. For instance, the remote system 120 can determine that the animal is within the area of the environment that the user designated as the animal notification zone. Based on that determination, the remote system 120 can determine that guest performing the scheduled service should not enter the environment.

For instance, if the scheduled service includes a scheduled delivery, the remote system 120 can determine that the delivery driver should not perform an in-home delivery. Additionally, the remote system 120 can update the scheduled delivery to include an outdoor delivery. In some instances, an outdoor delivery includes a delivery in which the delivery driver does not enter the environment. For instance, the delivery driver may leave a package for the user outside of the environment.

At 1012, the remote system 120 sends a message associated with the scheduled service to an electronic device. For instance, based on determining that the scheduled service should not include an in-home service, the remote system 120 can send a message to a device of the guest that is performing the scheduled service. In some instances, the message can indicate that the animal is within an animal notification zone of the environment. In some instances, the message can further include an image of the environment that indicates a position of the animal.

For instance, if the scheduled service includes a scheduled delivery, the remote system 120 can send a message to the device of the delivery driver that indicates that the animal is within an animal notification zone of the environment. In some instances, the message can further instruct the delivery driver to perform the outdoor delivery.

Figure 11:
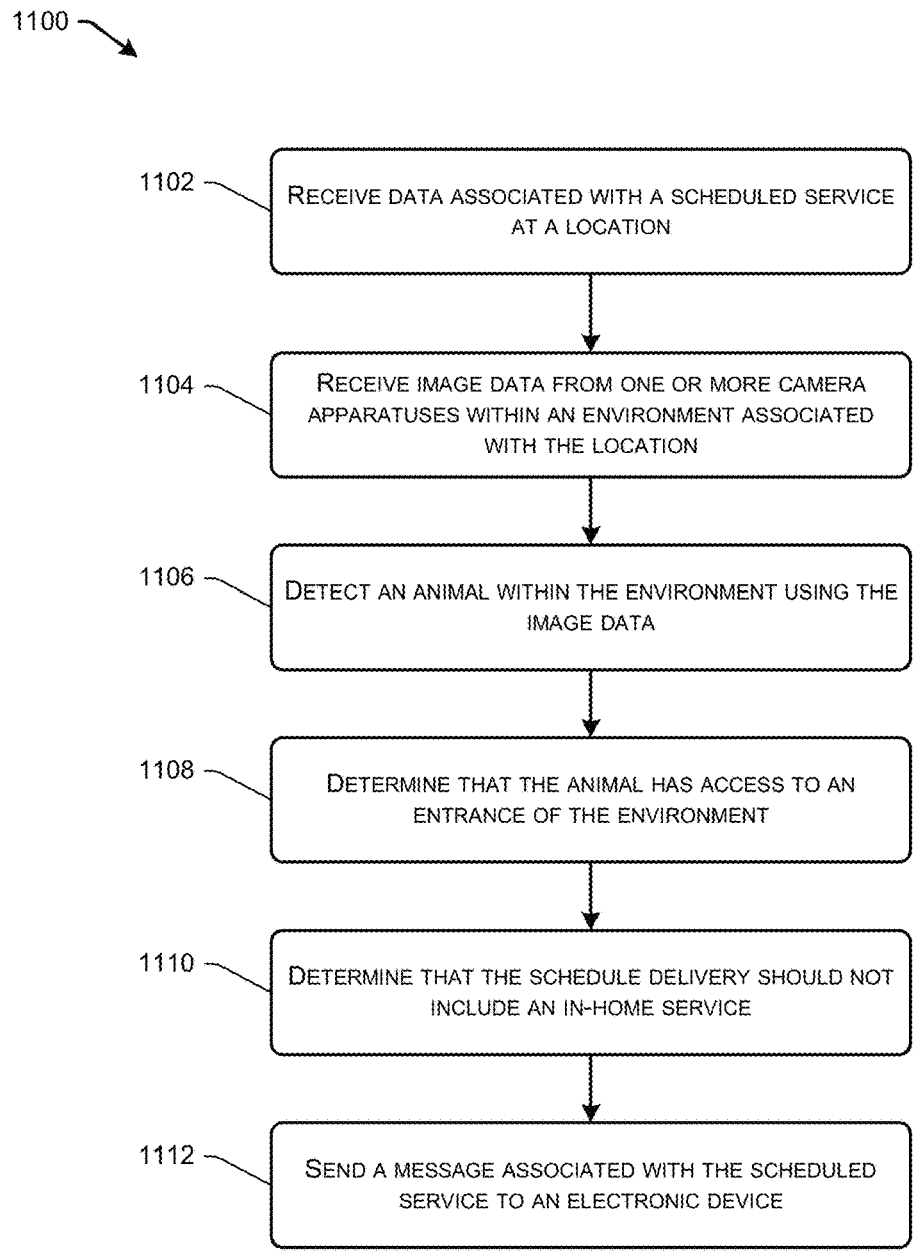
FIG. 11 illustrates a flow diagram of an example process for automatically determining whether an animal is within an animal safe zone or an animal notification zone. The example process further sends a message to a device based on the determination.

FIG. 11 illustrates a flow diagram of an example process 1100 for automatically determining whether an animal is within an animal safe zone or an animal notification zone.

At 1102, the remote system 120 receives data associated with a scheduled service at a location. In some instances, the remote system 120 can retrieve the data associated with the scheduled service from a schedules database. In some instances, the remote system 120 can receive the data associated with the scheduled service from an electronic device, such as an online marketplace. The data associated with the scheduled service can indicate, among other things, a location for the service and a scheduled time for the service. For instance, if the scheduled service includes a scheduled delivery, the data can indicate a delivery location and a delivery time.

At 1104, the remote system 120 receives image data from one or more camera apparatuses within an environment associated with the location. For instance, the remote system 120 can receive image data associated with the environment from multiple camera apparatuses within an environment. In some instance, each camera apparatus may capture image data associated with a given area (e.g., room, zone, etc.) within the environment. For instance, each camera apparatus may capture image data associated with a room within the environment.

At 1106, the remote system 120 detects an animal within the environment using the image data. For instance, the remote system 120 can analyze the image data using one or more image processing techniques in order to detect the animal within the environment. In some instances, after detecting the animal within the environment, the remote system 120 can track the animal within the environment using the image data.

At 1108, the remote system 120 determines that the animal has access to an entrance of the environment. For instance, the remote system 120 can use the image data of the environment to determine a position of the animal within the environment. The remote system 120 can then determine whether the position corresponds to an animal safe zone or an animal notification zone within the environment. For instance, the remote system 120 can determine that the animal is located within an animal notification zone based on the animal having access to the entrance of the environment. In some instance, the entrance of the environment is the location wherein the in-home service occurs.

At 1110, the remote system 120 determines that the scheduled service should not include an in-home service. For instance, based at least in part on detecting the animal in an animal notification zone, the remote system 120 can determine that the guest should not enter the environment to perform the in-home service. Additionally, when the scheduled service includes a scheduled delivery, the remote system 120 can update the scheduled delivery to include an outdoor delivery. In some instances, an outdoor delivery includes a delivery in which the delivery driver does not enter the environment.

At 1112, the remote system 120 sends a message associated with the scheduled service to an electronic device. For instance, based on determining that the scheduled service should not include an in-home service, the remote system 120 can send a message to a device of the guest that is performing the scheduled service. In some instances, the message can indicate that the animal is within an animal notification zone of the environment. In some instances, the message can further include an image of the environment that indicates a location of the animal.

For instance, if the scheduled service includes a scheduled delivery, the remote system 120 can send a message to the device of the delivery driver that indicates that the animal is within an animal notification zone of the environment. In some instances, the notification can further instruct the delivery driver to perform the outdoor delivery.

Figure 12:
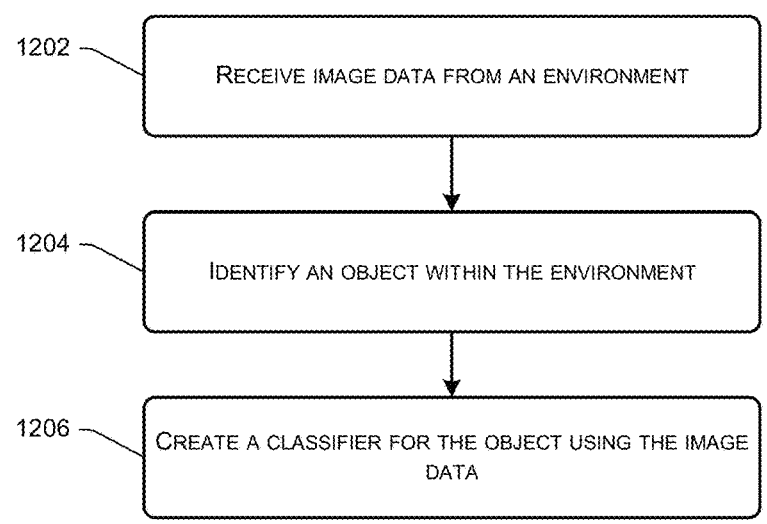
FIG. 12 illustrates a flow diagram of an example process for training one or more classifiers for an environment.

FIG. 12 illustrates a flow diagram of an example process for training one or more classifiers for an environment. At 1202, the remote system receives image data from an environment. For instance, the remote system 1202 can receive image data from one or more camera apparatus located within the environment. In some instances, the image data can include positive image data corresponding to images that include an object and negative image data corresponding to images that do not include the object.

At 1204, the remote system 120 identifies an object within the environment. For instance, the remote system 120 can identify a person, animal, item, or the like within the environment. In some instances, the remote system 120 identifies the object by receiving a message from an electronic device that indicates that the object is within the environment. For instance, the remote system 120 can receive a message from a device of a user that indicates that the object occupies the environment. In some instances, the remote systems 120 identifies the object by detecting the object within the environment using the image data.

At 1206, the remote system creates a classifier for the object using the image data. For instance, the remote system 120 can use the positive image data and the negative image data train an object classifier for the object using one or more machine learning algorithms. As discussed above, the remote system 120 can then use the object classifier to later detect the environment within the environment.

It should be noted that, in some instances, the remote system 120 can create multiple object classifiers for multiple objects within the environment using a similar process. For instance, the remote system 120 may receive a message from the device of the user that indicates that more than one object is within the environment. In some instances, for each object, the remote system 120 can receive positive image data corresponding to images that include the respective object and negative image data corresponding to images that do not include the respective object. The remote system can then use the positive image data and the negative image data train an object classifier for the respective object using one or more machine learning algorithms.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   one or more computer-readable media storing instructions that, when executed by the one or more processors, cause the system to perform operations comprising:
   receiving first data associated with a scheduled service, the first data indicating a location of an environment for the scheduled service;
   receiving second data generated by a sensor associated with the environment;
   determining, based at least in part on the second data, that a non-human animal is located at the environment;
   determining that a guest is to perform the scheduled service; and
   sending, to a second electronic device associated with the guest, third data indicating that the non-human animal is located at the environment.

2. The system as recited in claim 1, wherein:
   the receiving of the second data from the sensor comprises receiving image data generated by a camera located within the environment; and
   the determining that the non-human animal is located at the environment comprises determining that the image data represents the non-human animal.

3. The system as recited in claim 1, the one or more computer-readable media storing further instructions that, when executed by the one or more processors, cause the system to perform further operations comprising sending, to the second electronic device, fourth data indicating a zone within the environment for performing the scheduled service.

4. The system as recited in claim 1, the one or more computer-readable media storing further instructions that, when executed by the one or more processors, cause the system to perform further operations comprising:
   determining that the guest is located at the environment; and
   based at least in part on the determining that the guest is located at the environment, sending fourth data that causes a locking apparatus associated with the environment to unlock.

5. The system as recited in claim 1, the one or more computer-readable media storing further instructions that, when executed by the one or more processors, cause the system to perform further operations comprising:
   determining that the guest is finished with the scheduled service; and
   sending fourth data that causes a locking apparatus associated with the environment to lock.

6. The system as recited in claim 1, wherein the scheduled service is a delivery, and wherein the one or more computer-readable media store further instructions that, when executed by the one or more processors, cause the system to perform further operations comprising sending, to the second electronic device, fourth data indicating one of:
   that the delivery should occur outside of the environment; or
   that the delivery should occur within the environment.

7. The system as recited in claim 1, the one or more computer-readable media storing further instructions that, when executed by the one or more processors, cause the system to perform further operations comprising:
   storing user profile data, the user profile data indicating at least the location of the environment; and
   storing, in association with the user profile data, fourth data associated with the non-human animal.

8. The system as recited in claim 1, the one or more computer-readable media storing further instructions that, when executed by the one or more processors, cause the system to perform further operations comprising sending, to the sensor, a command to generate the second data.

9. A method comprising:
   receiving, by a system, first data associated with a scheduled service, the first data indicating a location of an environment for the scheduled service;
   receiving contact information associated the scheduled service;
   within a threshold period of time to the scheduled service, sending, by the system and using the contact information, a first request to a first electronic device, the first request associated with a non-human animal;
   receiving, by the system and from the first electronic device, second data indicating that the non-human animal is located at the environment;
   determining, by the system, that a guest is to perform the scheduled service at the environment; and
   sending, by the system, and to a second electronic device associated with the guest, third data indicating that the non-human animal is located at the environment.

10. The method as recited in claim 9, further comprising sending, to the second electronic device, fourth data indicating a zone within the environment for performing the scheduled service.

11. The method as recited in claim 9, further comprising:
    determining that the guest is located at the environment; and
    sending fourth data that causes a locking apparatus associated with the environment to unlock.

12. The method as recited in claim 9, further comprising:
    determining that the guest is finished with the scheduled service; and
    sending fourth data that causes a locking apparatus associated with the environment to lock.

13. The method as recited in claim 12, further comprising determining that the guest is located at the environment by at least one of:

receiving, from the second electronic device, fourth data indicating that the guest is located at the environment; or determining that image data represents an image of the guest, the image data generated by a camera located at the environment.

14. The method as recited in claim 9, wherein the scheduled service is a delivery, and wherein the method further comprises sending, to the second electronic device, fourth data indicating one of:

that the delivery should occur outside of the environment; or that the delivery should occur within the environment.

15. The method as recited in claim 9, further comprising:

storing user profile data, the user profile data indicating at least the location of the environment;

receiving, from the first electronic device, an identifier associated with the user profile data; and identifying the user profile data using the identifier.

16. The method as recited in claim 9, further comprising receiving, from the second electronic device, image data representing the non-human animal.

17. The method as recited in claim 9, wherein the storing of the contact information comprises storing at least one of:

a telephone number; or an email address.

18. A method comprising:

receiving first data associated with a scheduled service, the first data indicating a location of an environment associated with the scheduled service;

receiving second data generated by a sensor associated with the environment;

determining, based at least in part on the second data, that a non-human animal is located at the environment;

determining that a guest is to perform the scheduled service; and sending, to an electronic device associated with the guest, third data indicating that the non-human animal is located at the environment.

19. The method as recited in claim 18, further comprising sending, to the second electronic device, fourth data indicating a zone within the environment for performing the scheduled service.

20. The method as recited in claim 18, wherein the receiving of the second data generated by the sensor comprises at least one of:

receiving image data generated by a camera;

receiving audio data generated by a microphone; or receiving located data generated by a third electronic device.

* * * * *